US009560478B2

(12) United States Patent
Murad et al.

(10) Patent No.: US 9,560,478 B2
(45) Date of Patent: Jan. 31, 2017

(54) SYSTEM AND METHOD FOR LOCATION-BASED CONTENT DELIVERY

(71) Applicant: ADCENTRICITY CORPORATION, Toronto (CA)

(72) Inventors: Roy Murad, Thornhill (CA); Aaron Andrew Murad, Thornhill (CA); Noah Ezekiel Murad, Thornhill (CA)

(73) Assignee: Omni-Channel Technologies Inc., Toronto (CA)

( * ) Notice: Subject to any disclaimer, the term of this patent is extended or adjusted under 35 U.S.C. 154(b) by 0 days.

(21) Appl. No.: 13/985,215

(22) PCT Filed: Sep. 28, 2012

(86) PCT No.: PCT/CA2012/000908
§ 371 (c)(1),
(2) Date: Aug. 13, 2013

(87) PCT Pub. No.: WO2013/044369
PCT Pub. Date: Apr. 4, 2013

(65) Prior Publication Data
US 2014/0057658 A1    Feb. 27, 2014

Related U.S. Application Data

(63) Continuation of application No. 13/247,551, filed on Sep. 28, 2011, now abandoned.

(51) Int. Cl.
*H04W 4/02* (2009.01)
*G06Q 30/02* (2012.01)
(Continued)

(52) U.S. Cl.
CPC .......... *H04W 4/02* (2013.01); *G06Q 30/0241* (2013.01); *H04N 21/214* (2013.01);
(Continued)

(58) Field of Classification Search
CPC .............. G06Q 30/0241; H04N 21/812; H04N 21/44222; H04N 21/25891; H04N 21/2407; H04W 4/02
(Continued)

(56) References Cited

U.S. PATENT DOCUMENTS 7,200,633 B2     4/2007  Sekiguchi et al.
2002/0083157 A1*  6/2002  Sekiguchi et al. ............ 709/219
(Continued)

FOREIGN PATENT DOCUMENTS

EP    1182845 A2    2/2002
WO    2008045701 A2   4/2008

OTHER PUBLICATIONS

"Less Networks Smart AP—Installation and Customization Instructions", Revised Nov. 1, 2007, pp. 1-7.
(Continued)

*Primary Examiner* — William Nealon
(74) *Attorney, Agent, or Firm* — Ralph E. Jocke; Walker & Jocke

(57) ABSTRACT

Various embodiments are described herein for a system and method for providing location-based content delivery to at least one target zone. The system comprises at least one content transceiver unit having a processor configured to control the operation of the content transceiver unit, and a communications subsystem coupled with the processor and being configured to communicate with at least one target in the at least one target zone. The processor is configured to send an introductory content page based on a content campaign to the at least one target when the at least one target initiates a content transmission session with the at least one content transceiver unit. The processor is also
(Continued)

CONTENT DELIVERY SCHEDULE

870

| CONTENT CAMPAIGN | CONTENT DELIVERY LOCATION | CONTENT TRANSCEIVER UNIT | DAY | TIME SLOT | INTRODUCTORY CONTENT PAGE |
|---|---|---|---|---|---|
| CC1 | L1 | CTU1 | MONDAY | 10am-10:30am | ICP1 |
| CC1 | L1 | CTU2 | TUESDAY | 1pm-2pm | ICP2 |
| CC1 | L1 | CTU3 | WEDNESDAY | 7pm-8pm | ICP3 |
| CC1 | L1 | CTU4 | THURSDAY | 11am-12pm | ICP1 |
| CC1 | L1 | CTU1 | FRIDAY | 7:30pm-8pm | ICP2 |
| CC1 | L1 | CTU2 | SATURDAY | 11am-12pm | ICP3 |
| CC1 | L1 | CTU3 | SUNDAY | 7pm-3pm | ICP1 | configured to send selected content to the at least one target when the at least one target selects a content option in the introductory content page.

32 Claims, 14 Drawing Sheets

(51) Int. Cl.
    *H04N 21/214*     (2011.01)
    *H04N 21/24*     (2011.01)
    *H04N 21/258*     (2011.01)
    *H04N 21/262*     (2011.01)
    *H04N 21/2668*     (2011.01)
    *H04N 21/414*     (2011.01)
    *H04N 21/431*     (2011.01)
    *H04N 21/442*     (2011.01)
    *H04N 21/478*     (2011.01)
    *H04N 21/4782*     (2011.01)
    *H04N 21/4784*     (2011.01)
    *H04N 21/81*     (2011.01)

(52) U.S. Cl.
    CPC ... *H04N 21/2407* (2013.01); *H04N 21/25891* (2013.01); *H04N 21/262* (2013.01); *H04N 21/2668* (2013.01); *H04N 21/41407* (2013.01); *H04N 21/4312* (2013.01); *H04N 21/44222* (2013.01); *H04N 21/4782* (2013.01); *H04N 21/4784* (2013.01); *H04N 21/47815* (2013.01); *H04N 21/812* (2013.01)

(58) Field of Classification Search
    USPC ............ 455/456.3; 705/14.45, 14.58, 14.64, 705/14.57, 14.73; 709/219, 246, 231
    See application file for complete search history.

(56) References Cited

U.S. PATENT DOCUMENTS

| 2008/0086368 | A1 | 4/2008 | Bauman et al. | |
|---|---|---|---|---|
| 2010/0099441 | A1 | 4/2010 | Agarwal et al. | |
| 2011/0010229 | A1* | 1/2011 | Ow | 705/14.1 |
| 2011/0166932 | A1* | 7/2011 | Smith et al. | 705/14.53 |
| 2011/0302033 | A1* | 12/2011 | Lee et al. | 705/14.57 |
| 2012/0047011 | A1* | 2/2012 | Rippetoe et al. | 705/14.45 |

OTHER PUBLICATIONS

"Mobiquity Networks"—Proximity Marketing—Location Based Mobile Marketing, pp. 1-18.

"Hypertag—Proximity Marketing Specialists", http://hypertag.com.

\* cited by examiner

850 ↘ CONTENT DELIVERY SCHEDULE

| CONTENT TRANSCEIVER UNIT 852 | DAY 854 | TIME SLOT 856 | CONTENT PROVIDER 858 | INTRODUCTORY CONTENT PAGE 860 |
|---|---|---|---|---|
| CTU1 | MONDAY | 10am-10:10am | CP1 | ICP1 |
| CTU1 | MONDAY | 10:10am-10:20am | CP1 | ICP2 |
| CTU1 | MONDAY | 10:20am-10:30am | CP1 | ICP3 |
| CTU1 | MONDAY | 10:30am-11am | CP2 | ICP1 |
| ⋮ | ⋮ | ⋮ | ⋮ | ⋮ |

FIG. 8C

870 ↘ CONTENT DELIVERY SCHEDULE

| CONTENT CAMPAIGN 872 | CONTENT DELIVERY LOCATION 874 | CONTENT TRANSCEIVER UNIT 876 | DAY 878 | TIME SLOT 880 | INTRODUCTORY CONTENT PAGE 882 |
|---|---|---|---|---|---|
| CC1 | L1 | CTU1 | MONDAY | 10am-10:30am | ICP1 |
| CC1 | L1 | CTU2 | TUESDAY | 1pm-2pm | ICP2 |
| CC1 | L1 | CTU3 | WEDNESDAY | 7pm-8pm | ICP3 |
| CC1 | L1 | CTU4 | THURSDAY | 11am-12pm | ICP1 |
| CC1 | L1 | CTU1 | FRIDAY | 7:30pm-8pm | ICP2 |
| CC1 | L1 | CTU2 | SATURDAY | 11am-12pm | ICP3 |
| CC1 | L1 | CTU3 | SUNDAY | 7pm-3pm | ICP1 |

| CONTENT PROVIDER (952) | CONTENT FILE NUMBER (954) | CONTENT CAMPAIGN NUMBER (956) | FILE TYPE (958) | FILE SIZE (960) | FILE LINK (962) |
|---|---|---|---|---|---|
| CP1 | CF1 | CC1 | IMAGE | 250 KB | www.cms.com/cp1/f1.jpg |
| CP1 | CF2 | CC1 | VIDEO | 5 MB | www.cms.com/cp1/v1.mpg |
| CP1 | CF3 | CC2 | APPLICATION | 2 MB | www.cms.com/cp1/app1.exe |
| ... | ... | ... | ... | ... | ... |

| INTRODUCTORY CONTENT PAGE NUMBER (1002) | CONTENT PROVIDER (1004) | CONTENT CAMPAIGN NUMBER (1006) | BANNER (1008) | DESCRIPTION (1010) | COUPON (1012) | SOUND FILE (1014) | VIDEO FILE (1016) | WEBSITE (1018) | APPLICATION (1020) | SURVEY (1022) | SALES (1024) |
|---|---|---|---|---|---|---|---|---|---|---|---|
| ICP1 | CP1 | CC1 | CF1 | — | — | — | CF2 | — | CF3 | — | — |
| ... | ... | ... | ... | ... | ... | ... | ... | ... | ... | ... | ... |

FIG. 8G

SYSTEM AND METHOD FOR LOCATION-BASED CONTENT DELIVERY

FIELD

The various embodiments described herein generally relate to a system and method for providing location-based content delivery.

BACKGROUND

The advertising of various products and services is typically done through commercials and advertisements on conventional media outlets such as the radio, television and the Internet as well as through various forms of print media such as newsletters, newspapers, and flyers. These forms of advertisements are mainly delivered to potential consumers while they are in their home. However, there are also other forms of advertising outside of the home such as posters, billboards and signs which are placed at certain locations and can only be seen if they are in the direct line of sight of the potential consumers. Typically, the same advertisements are shown to the same potential consumers for a given media outlet, which is not the most effective way of advertising to potential consumers.

SUMMARY OF VARIOUS EMBODIMENTS

In one aspect, in at least one embodiment described herein, there is provided a system for providing location-based content delivery to at least one target zone. The system comprises at least one content transceiver unit comprising: a processor configured to control the operation of the content transceiver unit; and a communications subsystem coupled with the processor; the communications subsystem being configured to communicate with at least one target in the at least one target zone. The processor is configured to send an introductory content page based on a content campaign to the at least one target when the at least one target initiates a content transmission session with the at least one content transceiver unit, and the processor is configured to send selected content to the at least one target when the at least one target selects a content option in the introductory content page.

In at least some cases, if the at least one target does not select a content option, the processor is configured to automatically send default content to the at least one target and provide the at least one target with a page that provides an opportunity to purchase items related to the default content.

In at least some cases, the at least one content transceiver unit further comprises a network interface for connection to the Internet and the processor is further configured to allow the at least one target to browse the Internet and track whether the at least one target visits websites associated with the content campaign.

In at least some cases, the processor is further configured to direct the at least one target to one or more content pages based on tastes or preferences of the at least one target.

In at least some cases, the system further comprises a content management server coupled to the at least one content transceiver unit, the content management server being configured to control the at least one content transceiver unit to wirelessly transmit content for at least one content campaign according to a content delivery schedule.

In at least some cases, the processor is further configured to collect content usage statistics for a given content campaign to assess the effectiveness of the given content campaign.

In at least some cases, the processor is further configured to identify a mobile device used by the at least one target and track interactions with the mobile device over different sessions to configure content to send to the at least one target in future sessions.

In at least some cases, the system further comprises a plurality of content transceiver units with at least two of the plurality of content transceiver units being configured to transmit similar or different content campaigns to different target zones or to a common target zone.

The communications subsystem may communicate with a computing device used by the least one target, the computing device being one of a cell phone, a smart phone, a portable computer, a tablet computer and a desktop computer that can transmit and receive wireless signals.

The communications subsystem may comprise at least one of a Wi-Fi radio and a Bluetooth radio to communicate with the at least one target using at least one of a Wi-Fi signal and a Bluetooth signal respectively.

The introductory content page generally comprises at least one content option to allow the at least one target to select content associated with the content campaign.

In at least some cases, the at least one content option comprises at least one of a coupon object, a sound file object, a video file object, a website object, an application object, a survey object and a sales object.

In at least some cases, the introductory content page further comprises at least one of a banner area and a description area that provides a description of at least one of the content campaign and a content provider.

In at least some cases, the at least one content transceiver transmits a plurality of introductory content pages and associated content selected by the at least one target according to a content delivery schedule that specifies a day and a time slot for a given introductory content page to be transmitted by the at least one content transceiver unit.

In at least some cases, the system further comprises a server configured to provide a content management website that is coupled to the at least one content transceiver unit, the content management website being configured to allow a content provider to create the content campaign, transmit the content campaign using one or more content transceiver units at a given location according to a content delivery schedule and collect statistics related to the content campaign.

In at least some cases, the content campaign comprises content related to at least one of a product launch, a product sale, a service sale, a ticket sale, a brand awareness campaign, a cultural event, a sporting event, a historical event, a historical location, a park location, a convention, an entertainment event and a political campaign.

In at least some cases, the at least one content transceiver unit can be installed at one of a store, a fashion show, a sporting event, an exhibition, a concert, a trade show, a convention, a festival, a shopping mall, a theatre, a restaurant, a transportation station, a transportation vehicle, an arena, a hotel, a museum, an art gallery, a park, a beach, an office building, a monument, a street corner, and a park.

In at least some cases, statistics can be recorded for the content campaign, the statistics comprising at least one of total content transmissions during certain time periods in a given content campaign, total content transmissions for each type of content in the given content campaign, total content transmission for each type of content in the given content campaign during certain time periods, and Internet browsing habits of the at least one target when provided with content from the given content campaign.

In another aspect, in at least one embodiment described herein, there is provided a method for providing location-based content delivery to at least one target zone. The method comprises transmitting a target zone presence signal to the at least one target zone using a communications subsystem of a content transceiver unit; detecting if at least one target in the at least one target zone wishes to engage in a content transmission session with the content transceiver unit; sending an introductory content page based on a content campaign to the at least one target using the communications subsystem if the at least one target wishes to engage in the content transmission session; and sending selected content to the at least one target using the communication subsystem if the at least one target selects a content option in the introductory content page.

In at least some cases, if the at least one target does not select a content option, the method further comprises automatically sending default content to the at least one target and providing the at least one target with a page that provides an opportunity to purchase items related to the default content.

In at least some cases, the method further comprises allowing the at least one target to browse the Internet and track whether the at least one target visits websites associated with the content campaign.

In at least some cases, the method further comprises directing the at least one target to one or more content pages based on tastes or preferences of the at least one target.

In at least some cases, the method further comprises controlling the at least one content transceiver unit to wirelessly transmit content for at least one content campaign according to a content delivery schedule.

In at least some cases, the method further comprises identifying a mobile device used by the at least one target and tracking interactions with the mobile device over different sessions to configure content to send to the at least one target in future sessions.

In at least some cases, the method comprises providing the introductory content page with at least one content option that allows the at least one target to select content associated with the content campaign.

In at least some cases, the method further comprises providing the at least one content option which comprises at least one of a coupon object, a sound file object, a video file object, a website object, an application object, a survey object and a sales object.

In at least some cases, the method further comprises providing the introductory content page with at least one of a banner area and a description area that provides a description of at least one of the content campaign and a content provider.

In at least some cases, the method further comprises transmitting a plurality of introductory content pages and associated content selected by the at least one target according to a content delivery schedule that specifies a day and a time slot for a given introductory content page to be transmitted by the at least one content transceiver unit.

In at least some cases, the method further comprises providing a content management website to allow a content provider to create the content campaign, transmit the content campaign using one or more content transceiver units at a given location according to a content delivery schedule and collect statistics related to the content campaign.

In at least some cases, the method comprises installing the at least one content transceiver unit at one of a store, a fashion show, a sporting event, an exhibition, a concert, a trade show, a convention, a festival, a shopping mall, a theatre, a restaurant, a transportation station, a transportation vehicle, an arena, a hotel, a museum, an art gallery, a park, a beach, an office building, a monument, a street corner, and a park.

In at least some cases, the method further comprises recording statistics for the content campaign, the statistics comprising at least one of total content transmissions during certain time periods in a given content campaign, total content transmissions for each type of content in the given content campaign, total content transmission for each type of content in the given content campaign during certain time periods, and Internet browsing habits of the at least one target when provided with content from the given content campaign.

In another aspect, in at least one embodiment described herein, there is provided a computer readable medium comprising a plurality of instructions executable on a microprocessor of an electronic device for adapting the electronic device to implement a method of providing location-based content delivery to at least one target zone. The method comprises transmitting a target zone presence signal to the at least one target zone using a communications subsystem of a content transceiver unit; detecting if at least one target in the at least one target zone wishes to engage in a content transmission session with the content transceiver unit; sending an introductory content page based on a content campaign to the at least one target using the communications subsystem if the at least one target wishes to engage in the content transmission session; and sending selected content to the at least one target using the communication subsystem if the at least one target selects a content option in the introductory content page.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and in which:

FIG. 8C is an example of a content delivery schedule for a network of content transceiver units in a content delivery system;

FIG. 8D is an example of a content delivery schedule for a particular content provider;

FIG. 8F is an example of a database for a content repository of a content provider;

FIG. 8G is an example of a database for introductory content pages for a content campaign;

DETAILED DESCRIPTION OF THE EMBODIMENTS

Figure 1:
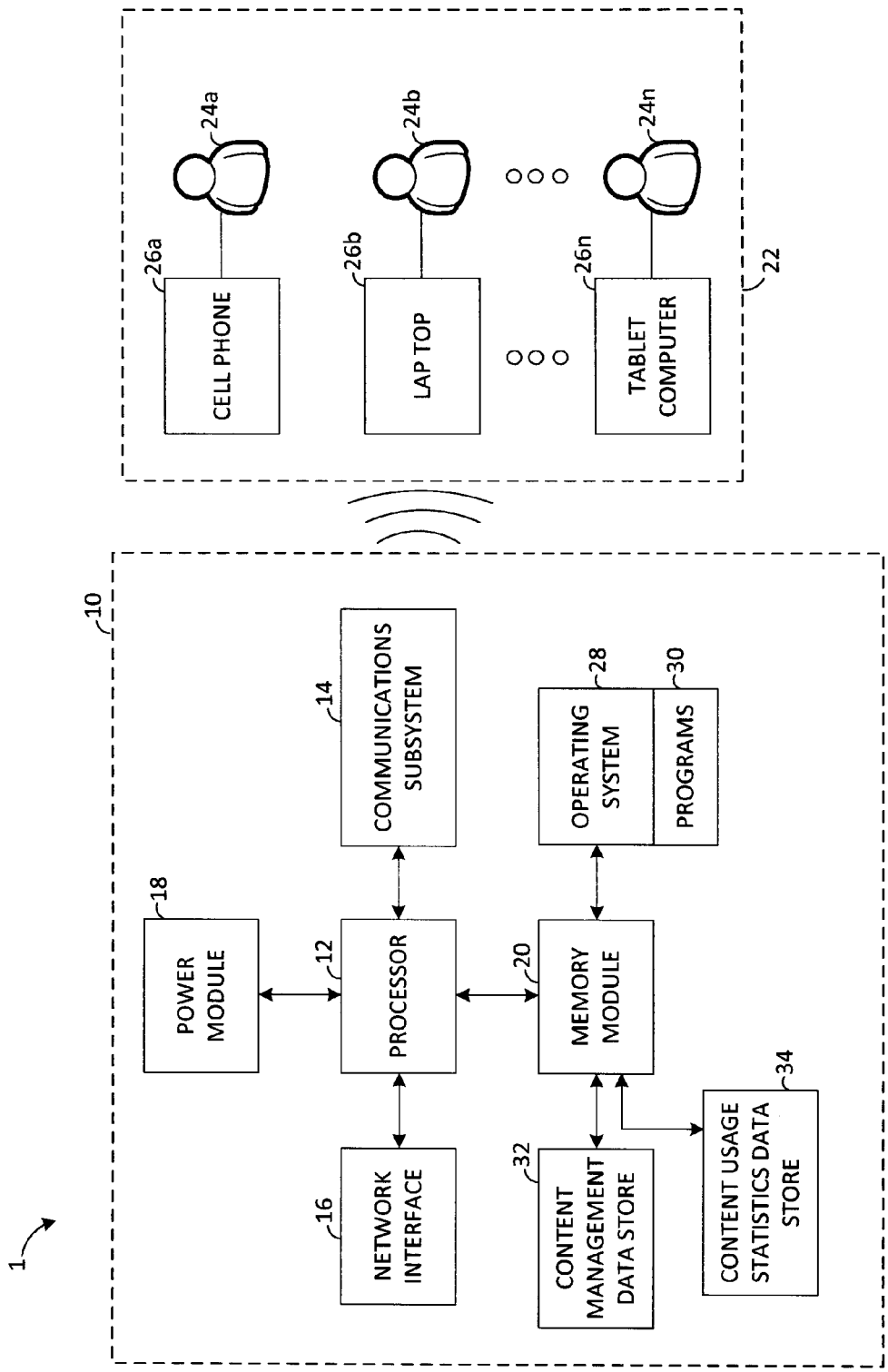
FIG. 1 is a block diagram of an example embodiment of a location-based content delivery system including a content transceiver unit.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses or processes described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should be noted that the term "coupled" used herein indicates that two elements can be directly coupled to one another or coupled to one another through one or more intermediate elements. It should be noted that the term "content provider" indicates an entity that wishes to disseminate content or information that is used in location-based or mobile content delivery. The content provider can be a retailer or vendor, a marketing firm, an advertiser, an event provider, or another entity that wishes to provide information for a product or service, a location or event, such as a town, a city, a museum, a library and the like, as well any tangible or intangible good or service that could be classified as such. Furthermore, the term "content campaign" indicates an effort to disseminate content related to a particular theme such as a product or service launch, an effort to raise brand awareness, a new exhibit at a museum, a cultural or sporting event, a political campaign and the like. In addition, the term "target" generally refers to an individual or group of people that are to be the intended recipients of content. Targets can include potential customers as well as visitors to certain locations or events. The term "target devices" indicates the wireless device (i.e. mobile device) that is being used by a target. Other examples for content providers, content campaigns and targets are provided throughout the description. Furthermore, it should be noted that the steps of the various methods described herein need not be completed in a linear fashion depending on the particular method. Furthermore, steps from different methods can be related to one another and may be carried out in parallel or sequentially as required.

The various embodiments described herein generally relate to the interactive provision of content based on the location of a target to a content transceiver unit and the ability and willingness of the targets to receive wireless signals that provide the content or links to the content. Location-based marketing can therefore be enabled with the technology described herein by providing wireless distribution of advertising content to potential consumers in particular locations. By using wireless communication, the various forms of location-based content delivery described herein are also able to address the exponentially growing market of mobile devices and Internet-based devices which includes cell phones, smart phones, and portable computers such as laptops, tablet computers and the like. The various embodiments described herein that can provide location-based content delivery also provide a unique opportunity for content providers to interact with their target audience by providing content directly to end-users (i.e. targets). In at least some embodiments, this includes taking a target through the entire retail experience from advertising a product or service to allowing the target to purchase the product or service online and providing shipping details and delivery instructions in order to deliver the product or service (when applicable) to an address as desired by the target. In the case of marketing, individuals can be strategically targeted based on the knowledge of their precise location, which allows brands to deliver more relevant advertisements. Advertisers are also able to create a very rich and entertaining experience by utilizing the technologies that are available with today's mobile devices including touch screens and various media-based software applications such as, but not limited to, flash players and the like in at least one embodiment described herein. With the technology described herein, content providers are able to provide targets with one or more of images, text, audio, video, applications and the like or links to any of these items.

The delivery of location-based content, as described herein, can also enhance an environment by offering an explanation or analysis on where an individual is or what an individual is looking at. Accordingly, location-based content is not limited to marketing or promotional materials but can also be used to provide an explanation of various events or locations such as certain parts of cities, parklands, historical sites, sporting and entertainment events, and the like. Accordingly, the location-based content can include information that tourists would find useful, helpful and/or interesting.

Referring now to FIG. 1, shown therein is a block diagram of an example embodiment of a location-based content delivery system 1, which in its most basic form includes a content transceiver unit 10. However, in other embodiments, further elements can be added to the location-based content delivery system 1 to allow it to be scalable and/or more user-friendly so that it can be used in a variety of different environments such as in, but not limited to, single-point hotspots and more complicated network topologies where different entities cooperate in various fashions. These different embodiments are described with respect to FIGS. 6 and 7. For example, the content transceiver unit 10 or a network of these units can be placed in dense areas with large numbers of people who have mobile devices.

The content transceiver unit 10 comprises a processor 12, a communications subsystem 14, a network interface 16, a power module 18, and a memory module 20. The content transceiver unit 10 can provide content to various targets (e.g. mobile device users) within a target zone 22 via wireless signals. For example, the content transceiver unit 10 can provide content to several targets 24a to 24n who may be using various mobile wireless devices (i.e. target devices) such as, but not limited to, a cell phone 26a, a laptop 26b and a tablet computer 26n. It should be noted that more than one of the same type of device can be used by multiple targets in the target zone 22. The content transceiver unit 10 operates in a stand-alone mode. However, in other embodiments, the content transceiver unit 10 can operate with a remote server or a website, as described in more detail with regards to FIGS. 5-7 and 9A. In at least some embodiments, the content transceiver unit 10 can be manufactured to have a small size which allows it to be placed in inconspicuous locations which generally do not impair its wireless capabilities, which can include, but are not limited to, within poster displays, behind certain walls and the like.

The processor 12 controls the operation of the content transceiver unit 10. Accordingly, the processor 12 is coupled to the communication subsystem 14 and the network interface 18 to instruct these devices to send and receive information as required. The processor 12 is also coupled with the memory module 20 to store and retrieve information as well as to execute the operating system 28 and various programs 30 which enable the content transceiver unit 10 to provide various functions as described herein. The processor 12 can be any suitable processor such as a microprocessor and the like as is commonly known by those skilled in the art.

The communications subsystem 14 includes at least one communication module that communicates with wireless devices using a certain communication protocol. For example, the communications subsystem 14 can include at least one of a Bluetooth (BT) unit and a Wi-Fi radio so that the content transceiver unit 10 can communicate with target devices having the capability to receive and transmit at least one of BT and Wi-Fi signals, respectively. The Wi-Fi radio can be configured to communicate according to the Global System for Mobile Communication (GSM) or General Packet Radio Services (GPRS) standards using techniques known to those skilled in the art. However, it should be understood that the communications subsystem 14 can be modified to transmit according to other wireless communication protocols such as 3G, 4G, LTE or other future communication protocols. The transmission parameters of the communications subsystem 14 can be configured and include inquiry scan range, transmission power, blacklist timeout as well as other parameters known to those skilled in the art.

The content transceiver unit 10 communicates with targets within a certain radius of its location. The communication range can be up to about 350 feet depending on the particular wireless technology that is used (Wi-Fi typically has a longer range) and the location where the content transceiver unit 10 is employed. For example, the range is larger if the content transceiver unit 10 is operating in a large open area versus an enclosed area surrounded by concrete or brick walls. The range of a content transceiver unit 10 can be extended by using an off-the-shelf range extender as is known by those skilled in the art. In some embodiments, the range can be also be adjusted manually to be shorter if necessary.

The Wi-Fi and BT communication standards allow for simultaneous connections with multiple targets. For example, the Wi-Fi signal provided by the communications subsystem 14 can simultaneously communicate with a certain number of targets depending on the location where the content transceiver unit 10 is located, the signal strength of the Wi-Fi signal and the number of communication channels that are being used. If communication is needed with more targets, then more content transceiver units may be used as described with respect to FIG. 7.

The network interface 16 can be a standard Ethernet connection such as, but not limited to, a Local Area Network (LAN) or an Internet connection either through a hard-wired connection or a wireless modem. The network interface 16 allows various types of information such as content, content campaigns, campaign schedules and the like to be stored, accessed and/or updated in the content transceiver unit 10. The network interface 16 also allows any statistics collected by the content transceiver unit 10 to be accessed. However, in at least some cases, this connection can also be provided by the communications subsystem 14 through a remote wireless connection such as, but not limited to, the Wi-Fi connection. The network interface 16 also allows a given target device to connect to the Internet so that targets that the content transceiver unit 10 is connected with can browse the Internet or be directed to certain websites on the Internet or a private network as the case may be.

The power module 18 provides power to the various components of the content transceiver unit 10. The power module 18 can be a standard power supply that is used for computer devices which is connected to a power line. In alternative embodiments, the power module 18 can be battery powered and therefore include a battery interface and one or more rechargeable or replaceable batteries. The power module 18 also includes other components, such as a regulator, protection circuitry and possibly switching circuitry (all not shown), as is known to those skilled in the art, that allow the power module 18 to provide a stable source of power to the other components of the content transceiver unit 10 during operation. The power module 18 provides enough power to allow the content transceiver unit 10 to operate while being able to communicate simultaneously on a predetermined number of channels with the various target devices 26a-26n as well as track the resulting interaction with the various target devices 26a-26n to generate content usage statistics (described in more detail below).

The memory module 20 can include several different types of memory elements (these elements are commonly known to those skilled in the art). For example, the memory module 20 typically includes at least one temporary storage element, such as Random Access Memory (RAM) and the like, as well as at least one permanent storage element such as Read Only Memory (ROM) and/or flash memory and the like. The operating system 28 and the programs 30 are stored in the permanent storage elements of the memory module 20 but these software applications as well as specific device drivers and the like can be loaded into the temporary elements of the memory module 20 during operation of the content transceiver unit 10. The permanent storage elements of the memory module 20 also include several data stores including a content management data store 34 and a content usage statistics data store 34. The data stores 32 and 34 can be databases or other organized collections of data which are suitable for the information that is being stored in these elements, as is known by those skilled in the art.

The operating system 28 consists of software, settings and data that are used to manage the hardware and software resources of the content transceiver unit 10. The operating system 28 also provides various services that are used to allow the processor 12 to execute the various programs 30 that are stored in the memory module 20 and dictate the functionality of the content transceiver unit 10. In this regard, the processor 12 may be considered to be configured to execute various steps according to the methods specified in the programs 30 when the processor 12 is executing any of the programs 30.

The programs 30 comprise a set of programs or modules that implement a content management system, which can be in various forms including a windows or Graphical User Interface (GUI) based format. The content management system can be used to configure the content transceiver unit 10 for operation to perform certain actions. For example, the content management system can be used to configure the operation of the content transceiver unit 10 (described in more detail with respect to FIGS. 8A-8G), configure particular content campaigns (e.g. the content files to send, the content campaign schedule, and the like), and the particular content transmission statistics that should be monitored (e.g. total content transmissions, total content transmissions sent per campaign, total content transmissions sent per timeframe, etc.).

The content management data store 32 stores content files containing the various types of content which are to be sent to the targets. The content files can be video files, image or graphics files, sound files, coupons, applications, links to websites, links to files, surveys or links to surveys (which may be online) and the like. The video files can include movie and game trailers, music videos, commercials and the like. The image files can contain movie posters, wallpaper or background images for cell phones, laptops or tablet computers, photos as well as images similar to print-type advertisements and the like. The sound files can contain ringtones, song clips, soundtracks, advertising jingles, audio recordings and the like. The coupons can include discounts for various products and services as well as special offers for potential consumers. The links to files can include links to video files, image or graphics files, sound files, and applications that can be accessed through a website, as well as websites or homepages of vendors. The survey can be provided directly in terms of the content from the content campaign or can be provided by a website. The survey can be used to obtain information about preferences, tastes, demographics, purchasing behavior, opinions and the like of the target. This can be done to conduct market research or to send the target to one or more content pages, such as websites, or private network web pages, that sell products that match the tastes or preferences of the target. The preferences or tastes can include information on certain types of products or services that the target is looking to purchase, prices that the target is willing to pay, and the like. Statistics can also be generated based on the survey information and used to provide feedback to the content provider. The survey can also be used to generate specific answers relating to customer service for a specific vendor, as well as their preferences related to the location-based content delivery system 1 (e.g. does the target feel that a survey sent to their mobile device was effective, did they enjoy it, etc.).

The content files can be related to a particular theme such as, but not limited to, launching a new product or service, raising the awareness for a brand, providing a special offer to potential consumers, providing information on a particular location or venue that the target is at or doing market research through a survey. The content files can also be used to create more complicated campaigns such as providing free prizes or products. For example, content can be transmitted such that every $n^{th}$ content transmission includes a special prize. In some cases, the content files can be used to send an application to the target device if the application is supported by the target device. The application can be a free game or a skill-testing puzzle as part of a prize campaign. The content files can also be used as a link to sell tickets to various events such as concerts or sporting events and the like, as well as to sell songs or other products. For example, content can be transmitted to consumers such that the target is directed to a website or some other page or portal where they can buy a ticket to a sporting event. The content files can also be used as a way for the target to view commercials for specific products sold by a vendor. For example, video content can be transmitted to consumers who would view a commercial of a product or service, which could be of short duration such as 10 seconds for example, before being allowed access to browse the Internet.

The content management data store 32 also contains configuration files that are used to configure the content transceiver unit 10 for operation. For example, the configuration files can include a content campaign schedule that specifies which content is to be transmitted from the particular content transceiver unit 10 during particular time slots in particular days (an example of this is shown in FIGS. 8C-8D). The configuration files can also specify how many content transceiver units are operating in a network and the operational parameters of each content transceiver unit (i.e. transmission power and the like). The configuration files can also be used to specify the parameters of a content campaign such as which content files to send, at which times to send the content files and whether the content transmission involves cycling through the content files, randomly sending a content file for a given content campaign or using another scheme for sending content to targets.

The content usage statistics data store 34 contains data related to the transmission and reception of content. For example, for a given target zone, the total number of content transmissions can be recorded for different times of the day and different days of the week to show on which days and at which times individuals or potential consumers are more receptive to content transmission. The number of content transmissions can also be recorded for different times of the day and different days of the week for particular types of content, such as, for example, content related to particular subject matter, content related to a particular product or content provided by a particular entity such as a retailer. This provides information on the times of day and the days of the week during which a potential consumer or individual is more receptive to this type of content. Furthermore, statistics can also be obtained for transmission of different types of content from the same entity. For example, in a marketing campaign for a particular vendor or product, different content files can be transmitted (i.e. a video file, an image file, a coupon and the like or a link to any of these items) and then statistics can be obtained to see how often the target device accesses these files or links which allows the content provider to determine which content files work the best (based on how often they are accessed by targets). There can also be statistics that track how often a target made a purchase based on the content that was transmitted to the content. For example, the target can be redirected to a website where the target can make an online purchase related to the transmitted content and statistics can be kept on how often this generally occurs for a content campaign as well as how often this occurs for different types content that is transmitted as part of a content campaign to see which content is more effective.

Statistics can also be obtained for the type of mobile devices that are used by the target (i.e. known as detected target models) to receive content from a particular content provider for a particular time slot (i.e. a particular time slot during a particular day). Data can also be recorded on particular target devices so that statistics can be tracked for different target devices during their interaction with the content transceiver unit 10 for a particular time slot or day as well as for repeated interactions with the target device over time. For example, the content transceiver unit 10 can be installed at a store that is frequented by repeat customers with target devices whose behavior over repeated visits (e.g. past sessions) can be tracked using device-specific statistics in order to determine information about the target, such as how their behavior may change as a content campaign changes as well as to configure content to send to the repeat customers during future sessions.

Other statistics that can be collected may also include the number of wireless transmissions that use a particular communication protocol and the proportion of transmissions of each type that were successful (e.g. the number of transmissions that were successfully received by the target device) which indicates the ability to transmit these types of wireless signals in the location where the content transceiver unit 10 is installed. Furthermore, several other communication-based statistics can be obtained such as the number of BT transmissions, the percentage of successful BT transmissions, the number of Wi-Fi transmissions, the percentage of successful Wi-Fi transmissions, the total number of transmissions and the total percentage of successful transmissions. When the statistics described herein are used for marketing campaigns, these statistics provide accurate information that a content provider, such as a retailer for example, should be able to use to increase the amount of purchases related to their promotions compared to using traditional media outlets and traditional marketing campaigns since the statistics indicate exactly how many potential consumers viewed the content, which content was viewed the most, as well as when and where the content was viewed.

Statistics can also be obtained that show the level of interaction between the targets and the content transceiver unit 10. For instance, a target may choose to browse the Internet through the content transceiver unit 10 in which case Internet browsing habits of the target can be recorded. The Internet browsing statistics can be obtained for at least one of the amount of time that a target spends browsing the Internet, the proportion of targets that browse the Internet, the number of targets that visit websites that are related to the content provider of the content that is sent to the target's device, the number of targets that visit other websites, such as, for example, the website of a competitor to the content provider and the number of targets that visit websites related to the content provider and competitors of the content provider. This provides further insight into the effectiveness of a content campaign such as a marketing campaign.

The statistics that can be collected can include all of the statistics discussed herein or a subset thereof which is selected based on the preferences of a content provider or selected based on some other criteria.

A detailed report can be provided to the content provider so that they can determine the effectiveness of the content campaign. For example, effectiveness can be determined based on the number of impressions (e.g. the amount of people who interact with the content transceiver unit (i.e. browse the Internet or receive content), the number of interactions with targets (e.g. the number of potential consumers or individuals who agreed to receive content), the level of engagement of the targets (e.g. the level of activity of the targets based on their acceptance to receive content, browse the Internet related to the content or just browse the Internet or some other network) and the like. Accordingly, the location-based content delivery system 1 provides a novel opportunity to monitor the effectiveness of content or marketing campaigns compared to traditional marketing techniques. In cases where there are multiple content transceiver units, each of the units can provide their own individual reports or these statistics can be amalgamated together.

The location-based content delivery system 1 can be installed in various locations where it is desired to provide content to targets (e.g. potential consumers, information users, etc.) based on the location of the targets within a target zone. For example, the content transceiver unit 10 can be installed in shopping malls and other retail outlets, which provides brands with a new way to engage their target audience in these busy locations. The content transceiver unit 10 is able to provide a direct and personal form of communication to each target since each target agrees to receive the content and is therefore a fully willing participant. Since the delivery of content is location-based, the content transceiver unit 10 may increase the effectiveness and persuasiveness of marketing campaigns by allowing for the geographic segmentation of end-users based on where the content transceiver unit 10 is located.

The location-based content delivery system 1 can also be installed at various events such as store openings, fashion shows, sporting events, exhibitions, trade shows, conventions, festivals, concerts and the like. The location-based content delivery system 1 can also be installed in various retail locations such as stores, shopping plazas, shopping malls, theatres, supermarkets and restaurants. The location-based content delivery system 1 can also be installed at various public places such as, but not limited to, transportation stations such as airports, railway stations, bus stations, and subway stations as well as on various public transportation vehicles such as airplanes, railway trains, buses, ships and subway trains. Other venues include arenas, stadiums, hotels, museums, art galleries, parks, beaches, office buildings, monuments, street corners, parks and the like.

In the case of the location-based content delivery system 1, the content transceiver unit 10 operates in a stand-alone format since the content transceiver unit 10 operates in isolation. In alternative embodiments, the content transceiver unit 10 can operate in a centralized format (which is described with respect to FIGS. 5-7). During manufacture, the content transceiver unit 10 is loaded with content and one or more content campaigns. Once the content transceiver unit 10 is installed it is operated to provide the content according to the content campaign. The content transceiver unit 10 can then be accessed at various intervals or times after the initial installation to update the content, the content campaign(s) and/or to access the statistics related to each content campaign. This information can be accessed by directly connecting to the network interface 16 through a wired connection or remotely through the Internet, as the case may be. In some cases, the information can be accessed through a wireless connection with the communications subsystem 14. In some cases, the content transceiver unit 10 can be configured to access a central repository or central server to determine if there have been any updates to content or content campaigns and request the updated material if applicable.

In some cases, the content transceiver unit 10 can be designated for "fixed operation" and be permanently installed at a location. For example, the content transceiver unit 10 can be installed with a corresponding advertisement or display and then transmit content that is directly related to the specific signage at its installation location. If the signage provides different displays at different times of the day or week (as in the case of an electronic billboard) then the content transceiver can also transmit different content related to each of the different displays (in this case each display may be related to a different content provider). The content transceiver unit 10 can also be permanently deployed in other locations such as office locations, schools, shopping stores as well as any of the other locations previously described.

In some cases, the content transceiver unit 10 can also be designated for "temporary operation" and be only installed at a location for a certain period of time. For example, the content transceiver unit 10 can be installed at a venue, such as a sporting event or a convention, which only lasts for a certain period of time such as three hours, 1 day or any other period of time, after which the content transceiver unit 10 is uninstalled and moved to another location. In this case, the content transceiver unit 10 is provided with content that is related to the venue or event and otherwise operates as it normally would. In this case, the content transceiver unit 10 can be "rented" by the content provider.

It should be noted that in the case of "fixed operation" or "temporary operation" there may be several content transceiver units 10 that are installed and can operate independently of one another or in coordination with one another, as the case may be.

Figure 2:
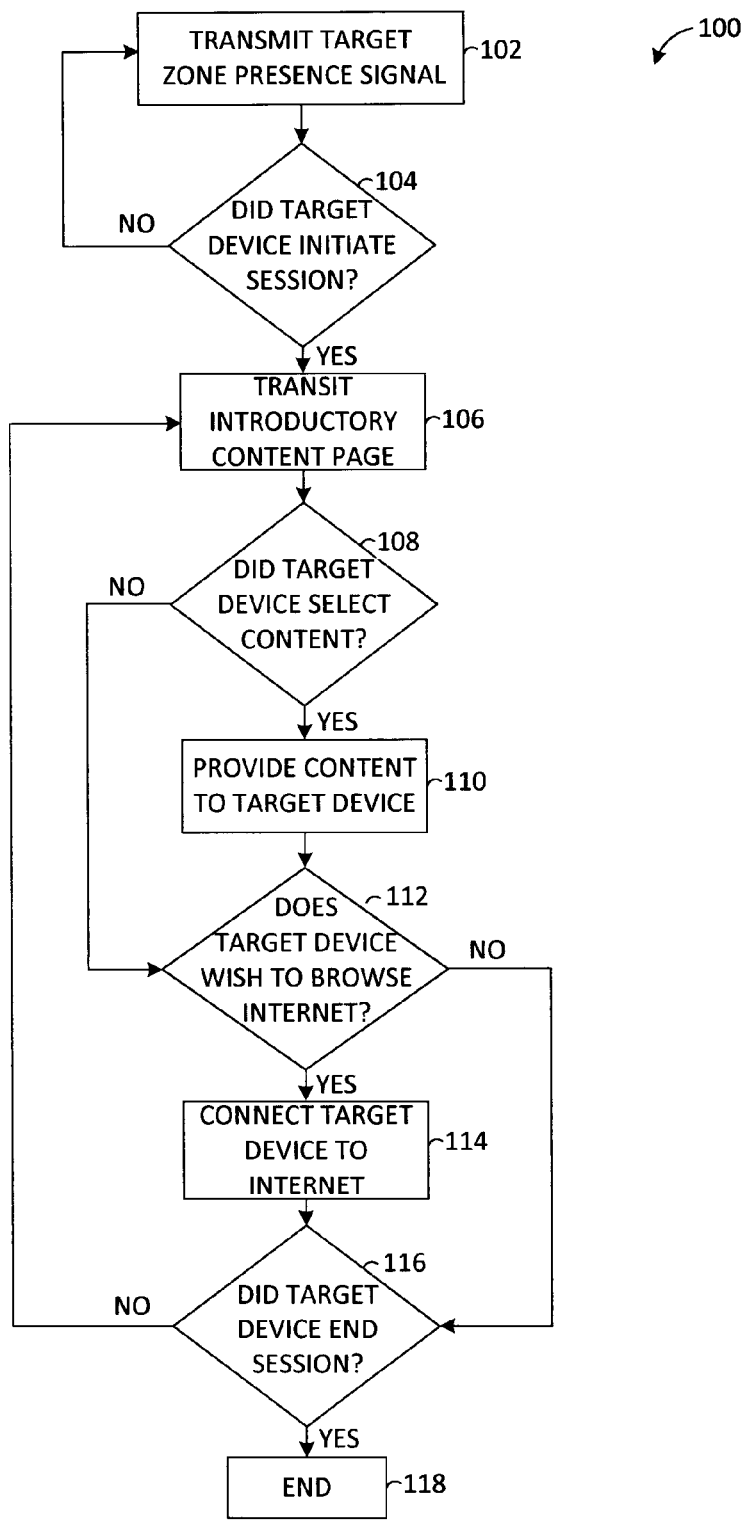
FIG. 2 is a flowchart of an example embodiment of a location-based content delivery method.

Referring now to FIG. 2, shown therein is a flowchart of an example embodiment of a location-based content delivery method 100 that can be used by the content transceiver unit 10. The method 100 can be used by any content transceiver units in any embodiments of the location-based content delivery system described herein. However, for illustrative purposes, the location-based content delivery method 100 will be described with regards to the content transceiver unit 10.

At step 102, the content transceiver unit 10 indicates that it is present in a target zone where it is installed by transmitting a target zone presence signal. This can be done using at least one of a BT and a Wi-Fi signal depending on the structure of the communications subsystem 14. For example, in the case of Wi-Fi, the content transceiver unit 10 can provide a Wi-Fi gateway and the different kinds of mobile target devices will have various ways to connect to the Wi-Fi gateway as is known by those skilled in the art. When a target arrives in the target zone and has a mobile device that is turned on and able to receive the target zone presence signal, the target will receive an indication from their mobile device of the availability of the target zone presence signal. Alternatively, the target can open an Internet browser on their target device to access a certain URL. This operation is detected by the content transceiver unit 10, which can then take action to communicate with the target as described for step 104. The target zone presence signal can be branded according to the content provider who is providing the content. The branding can include using a certain label for the target zone presence signal such as "Store X product promotion signal", for example. This provides a clue to the target about the nature of the target zone presence signal. There may also be some signage at the target zone explaining the nature of the target zone presence signal to educate targets who are not familiar with the location-based content delivery technology that is installed at their present location.

At step 104, if the target decides to interact with the target zone presence signal to initiate a content transmission session, then the method 100 goes to step 106 at which point the content transceiver unit 10 will receive information about the target's mobile device such as, for example, an IMEI code if the target's mobile device is a cell phone. The information about the target's mobile device allows the content transceiver unit 10 to format its wireless signals and information that it sends to the target's mobile device so that it can be properly received by the target's mobile device, which can be used in certain embodiments to format the transmitted content to accommodate the different dimension and screen resolutions of the display of the mobile device being used by the target. This information also allows the content transceiver unit 10 to track its interaction with the target's mobile device so that statistics can be collected on the target during the current session as well as future sessions whenever the target interacts with the content transceiver unit. However, if the target does not wish to accept the target zone presence signal at step 104 then the method 100 goes to step 102 at which point the content transceiver unit 10 continues to transmit the target zone presence signal and wait for another target's mobile device to initiate a content transmission session. It should be noted that method 100 can be carried out in parallel with several mobile devices since the content transceiver unit 10 can communicate over many radio channels in accordance with the communication protocol that is being employed by the communications subsystem 14.

At step 106, the content transceiver unit 10 transmits an introductory content page to the target's mobile device that has initiated the content transmission session. The introductory content page can have various formats and is related to the content campaign (such as, but not limited to, an advertising campaign, product promotion, service promotion, brand promotion, ticket sales, product sales, information campaign for an event or location, and the like for example) that is being presented by the content transceiver unit at that particular transmission time. The introductory content page generally provides an indication as to the nature of the content. This indication can be provided by text and/or images. The introductory content page also includes several content options (which may include content links) that the target can select to access the associated content. The introductory content page is described in more detail with respect to an example provided in FIG. 3. It should be noted that the content introductory pages are not necessarily static and can change as the content campaign changes. In addition, it should be understood that various formats can be used for the content introductory pages.

At step 108, the content transceiver unit 10 receives an indication as to whether the target has decided to receive the content by selecting one of the content links or content options in which case the method 100 moves to step 110. Otherwise, if the target has decided not to receive the content, the method 100 moves to step 112. It should be noted that this step is optional and the target need not be provided with Internet service in some embodiments. Furthermore, in an alternative embodiment, if the target does not wish to select a content option on the introductory content page, then the target may be provided with default content, such as short duration advertisement for example and the target can then be directed to a website or another page or portal where the target can make a purchase of at least one item related to the default content. In other embodiments, other types of content can be provided as the default content to the target if they do not select a content option or do not wish to browse the Internet. The default target can be based on current items that are being offered by content providers or based on the target's past interactions with the location-based content delivery system.

At step 110, the content transceiver unit 10 provides the content to the target. As previously described, the content can be an image, a video file, a coupon, a sound file, an application file and the like. In the cases where the content resides on the Internet and a link to the content's location on the Internet was given in the introductory content page, the content transceiver unit 10 can connect the target's mobile device to the location on the Internet where the content resides.

In an alternative embodiment, if the selected option is a survey option, then the target is provided with a survey and based on the target's answers to various questions in the survey, the target can then be taken to one or more webpages in a sequential manner. In some cases, the webpages can offer an item that is related to the survey for sale. In some embodiments, this process can be repeated multiple times to send the target to a variety of webpages where they can purchase a variety of items or review multiple pieces of content.

In an alternative embodiment, content can also be provided to the target based on statistics that have been kept on the target. For example, the target may be a repeat visitor to the content target zone and the content transceiver unit 10 can be configured to remember previous interactions with the target and send the target content based on these previous interactions.

At step 112, the content transceiver unit 10 can provide an option for the target to browse the Internet and view a website associated with the content provider if the target was not already directed to the content provider's website in step 110. If the target was already directed to the Internet in step 110, then at step 112 the content transceiver unit 10 can provide an option to allow the target to continue to browse the Internet. In either case, if the target wishes to browse the Internet at this point then the method 100 goes to step 114; otherwise the method 100 goes to step 116.

At step 114, the content transceiver unit 10 allows the target to browse the Internet through the target's mobile device. At this point, the browsing habits of the target can be monitored and used in generating the content usage statistics in order to provide feedback to the content provider on the effectiveness of the content campaign as previously described. Once the target stops browsing the Internet, the method 100 goes to step 116.

At step 116, the method 100 checks to see if the target has ended the content transmission session. If so, the method 100 goes to step 118 at which point the method 100 ends. However, if the target wishes to continue with the content transmission session, the method 100 goes to step 106 in which another introductory content page is sent to the target's mobile device. Depending on the configuration of the content campaigns, the introductory content page can be associated with another content provider when the method 100 goes back to step 106. Alternatively, at this point the content campaign can be associated with the same content provider but a different introductory content page is presented with different content options every time the same target goes from step 116 to step 106 of the method 100. Alternatively, different content campaigns or different introductory content pages can be provided at a set interval such as, but not limited to, every 5 to 10 minutes, for example.

In some cases, in the event that the target is moving and leaves the range of one particular content transceiver unit before they choose to interact with the content transceiver unit, then the target can choose to interact with a new content transceiver unit when the target is in range of the new content transceiver unit. However, if the target has received the introductory content page, then this will stay on the target's mobile device until the associated content has finished displaying (if fully downloaded). However, if the target continues to physically move after step 114 out of the target zone associated with the content transceiver unit while browsing the Internet, then the target will lose the signal and no longer be able to browse the Internet.

Figure 3:
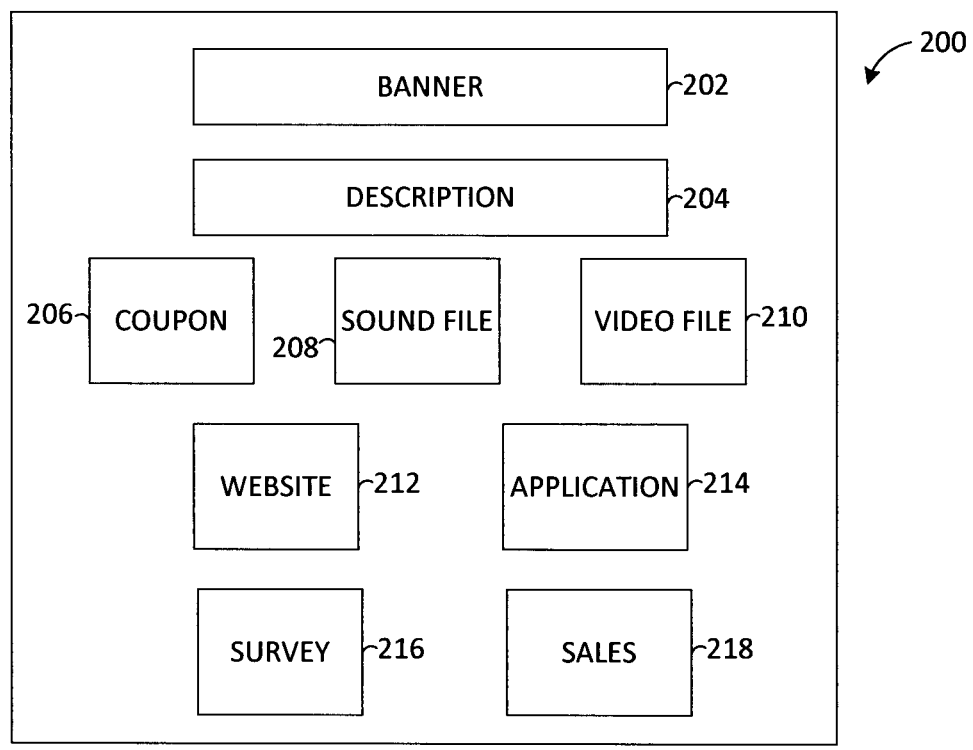
FIG. 3 is an image of an example generic introductory content page that can be sent to a target device from the content transceiver unit at the beginning of a content transmission session.

Referring now to FIG. 3, shown therein is an image of an example generic introductory content page 200 that is sent to a target from the content transceiver unit 10 at the beginning of a content transmission session. In general, the introductory content page 200 comprises a banner area 202, a description area 204, and several content objects including a coupon object 206, a sound file object 208, a video file object 210, a website object 212, an application object 214, a survey object 216 and a sales object 218. Other information may also be included in some embodiments such as a disclaimer. Different embodiments of the introductory content page 200 will typically have the banner area 202 but may include one or more of the objects 204 to 218 (i.e. some of these objects may not be included in some introductory content pages). However, there can be some cases in which the introductory content page 200 does not have the banner area 202. Furthermore, in alternative embodiments, the objects do not have to be arranged or physically located as shown in FIG. 3; many variations are possible and the introductory content page 200 is 100% customizable. For example, the entire content introductory page 200 can be a picture, sound file, etc. The coupon object 206, sound file object 208, video file object 210, website link object 212, application object 214, survey object 216 and sales object 218 are interactive in that the target can select one of these areas with their mobile device (by using some appropriate input device such as a touchscreen, a thumbwheel, a trackball, a pointer and the like) in step 108 of the method 100 and is then provided with the selected content in step 110 of the method 100. In this regard, the objects 204 to 214 can be buttons or images with an embedded link or images with a hyper-tag link situated beneath them or any other suitable interactive user interface.

The banner area 202 is an area of the introductory content page which provides an indication of the content provider. For instance, it can be text or a logo of a retailer, vendor, event venue, historical site and the like that is providing the content. The description area 204 can provide some additional text that describes the nature of the content such as, but not limited to, if the content is related to a product promotion, or a limited time offer or the content represents a prize that the target has won, for example. A disclaimer related to the content campaign may also be included here in some cases.

The coupon object 206 typically can include a link to a coupon that is offered by the content provider. If the target selects the coupon object 206, then an electronic message or an image representing the coupon can be delivered to the target's mobile device. In some cases, the target's mobile device can be directed to a website where the target can provide information such as an email address to receive the coupon. In some cases, the coupon object 206 can include the coupon itself, which the target can then save on their mobile device. In alternative embodiments, the object can be a newsletter which requires the target to provide their email address in order to subscribe to and receive the newsletter.

The sound file object 208 can include a link to a sound file that is provided by the content provider. If the target selects the sound file object 208, then a sound file can be delivered to the target's mobile device or streamed to the target's mobile device or the target's mobile device can be directed to a website where the target can listen to the sound file. The sound file can be a voice recording that provides information related to a particular campaign or information related to a particular location or venue. In some cases, the sound file can be an audio commercial and the like for marketing or promotional content campaigns.

The video file object 210 can include a link to a video file that is provided by the content provider. If the target selects the video file object 210, then a video file can be delivered to the target's mobile device or streamed to the target's mobile device or the target's mobile device can be directed to a website where the target can view the video file. The video file can provide information related to a particular campaign or information related to a particular location or venue. In some cases, the video file can be a television or Internet commercial, a movie trailer or a short video clip and the like for marketing or promotional content campaigns.

The website link object 212 typically includes a link to a website that is related to a content campaign or the content provider. If the target selects the website link object 212, then the target's mobile device is directed to the corresponding website where the target can browse information related to the content campaign or content provider. In at least some cases, the target is also free to browse other areas of the Internet after viewing the website. In some cases the website link object 212 may include a link to a website where the target can purchase a product, service, ticket or other item. In this case, the target would be directed to other webpages where the target provides payment and shipping information if applicable. In some cases, the website link object 212 may be designed to send the target to a number of web pages in a sequential fashion.

The application object 214 typically includes a link to an application that can be downloaded to the target's mobile device when the target selects the application object 214. The application is related to the content campaign and may be a game application, and the like. In at least some cases, if the target selects the application object 214, then the target's mobile device can be sent an electronic message or directed to a website where the target is required to provide information such as a name and an email address in order to receive the application. Applications can be related to various subjects such as, but not limited to, software updates for a target's wireless device, news and the like.

The survey object 216 allows the target to select whether they wish to partake in a survey. The survey associated with the survey object 216 can be provided directly in terms of the content from the content campaign or can be provided by a website. In other cases, the survey associated with the survey object may be online in which case the survey object 216 includes a link to the survey. As previously described, the survey can be used to obtain market research for the content provider or it can be used to obtain information about preferences or tastes of the target so that the target can be, for example, provided content or directed to websites related to the survey results. In some cases, the websites can sell products that match the tastes or preferences of the target as previously described.

The sales object 218 typically includes a link to a website which sells items related to the content in the introductory content page 200. The items can be tickets to various events or venues, song downloads and other products or service. In this case, the target would also provide purchase information and possibly shipping information if needed.

Figure 4:
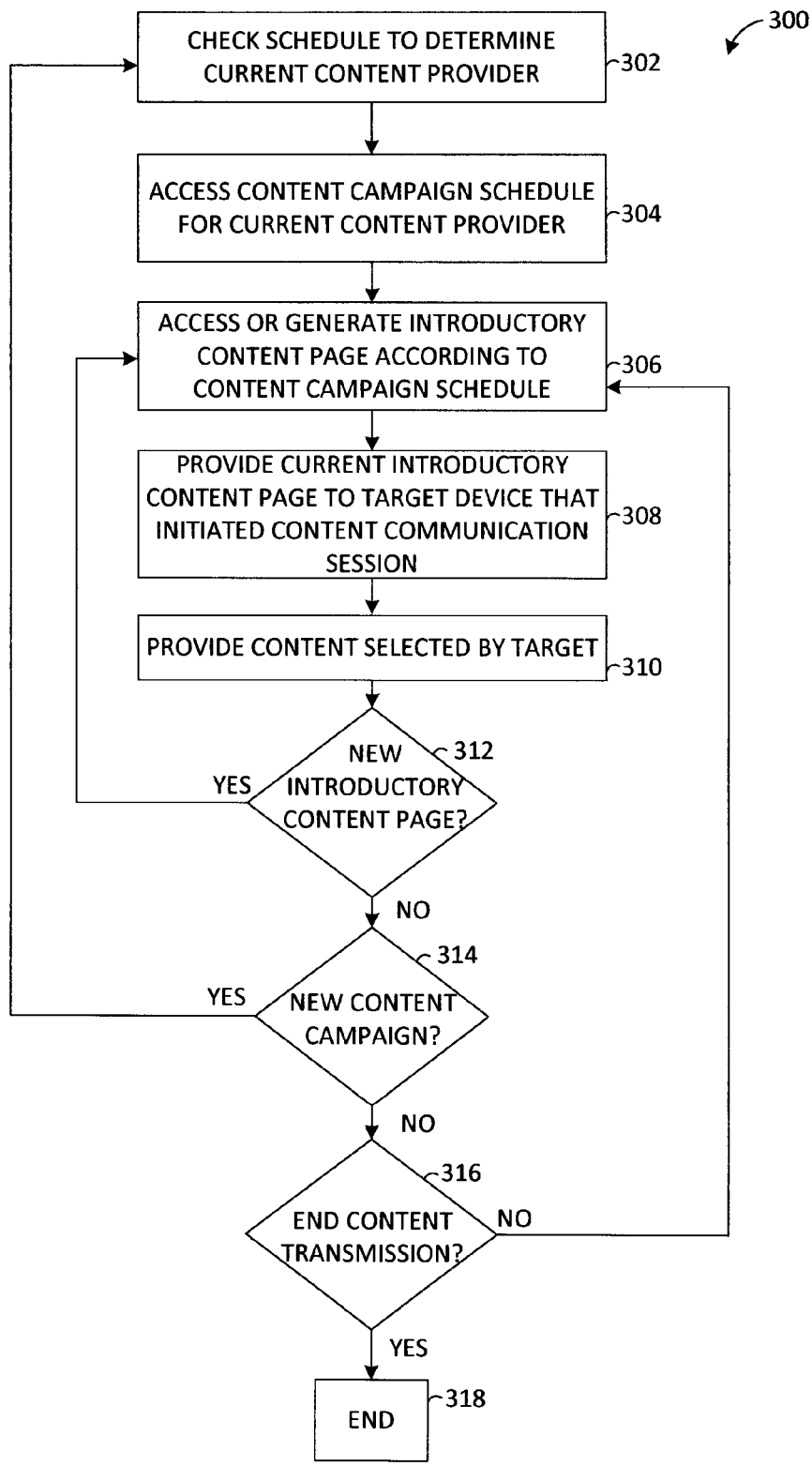
FIG. 4 is a flowchart of an example embodiment of a method for selecting content to provide in a location-based content delivery system.

Referring now to FIG. 4, shown therein is a flowchart of an example embodiment of a method 300 used by the content transceiver unit 10 for selecting content to provide to a target in a location-based content delivery system. At step 302, the content transceiver unit 10 checks a content delivery schedule (see FIGS. 8C-8D for example schedules) to determine the current content provider that is scheduled to deliver content based on the current time and the current day. At this point the content transceiver unit 10 can also determine the length of time for which the content is to be transmitted for the current content provider.

At step 304, the content transceiver unit 10 accesses the content campaign schedule for the current content provider. The content campaign schedule dictates the type of content and associated content files that are to be delivered during the current time slot for the current content provider for a given introductory content page. For example, there can be two introductory content pages for a content provider in which the first introductory content page includes the banner area 202, the description area 204, the coupon object 206, and the website object 212 and the second introductory content page includes the banner area 202, the description area 204, the sound file object 208, the video file object 210, and the website object 212. Other variations on the type of objects used in the introductory content pages are also possible.

The content campaign schedule can also specify that the content can change across different time slots that are associated with a given content provider. For example, for the given content provider there can be different introductory content pages that are used in different time slots (either in the same day or across different days). The content can also change during the same time slot for the given content provider. For instance if a time slot is 30 minutes in duration, then the content campaign schedule for the given content provider can dictate that different introductory content pages are transmitted every few minutes (such as, but not limited to 5 or 10 minutes, for example) during the 30 minute time slot. Alternatively, the content campaign schedule can specify that different introductory content pages are transmitted on subsequent transmissions to the same target. Accordingly, in general, the content transceiver unit 10 is instructed to transmit content information for a certain amount of time. This time specification can be different for different content transceiver units that are used together in a network. There can also be embodiments in which the content transceiver unit 10 can be generally reconfigured in real-time. These are just a few examples and it should be noted that other formats for providing the introductory content pages can also be used.

At step 306, the content transceiver unit 10 accesses or generates an introductory content page according to the content campaign schedule. For instance, in some embodiments, different introductory content pages can be stored in a content repository for the current content provider. The different introductory content pages have been generated in accordance with the content campaign schedule for the current content provider. In this case, the content transceiver unit 10 then selects the proper introductory content page based on the content campaign schedule. For example, if there are seven introductory content pages and the content campaign schedule specifies that each introductory content page is used during a different day of the week, then the content transceiver unit 10 selects the introductory content page that corresponds to the current day. Alternatively, if the content campaign schedule specifies that an introductory content page is to be presented during a certain interval in a time slot (i.e. 0 to 10 minutes, 11 to 20 minutes and 21 to 30 minutes of a 30 minute time slot for example), then the content transceiver unit 10 selects a different introductory content page during a new interval of the time slot. There can be other variations on how the introductory content page is selected by the content transceiver unit 10. In other embodiments, rather than select stored introductory content pages, the content transceiver unit 10 can generate the introductory content pages as needed according to the content campaign schedule.

At step 308, the content transceiver unit 10 provides the introductory content page according to the content campaign schedule to the target mobile devices that have initiated a content communication session with the content transceiver unit 10. At step 310, the content transceiver unit 10 provides the content selected by the targets or directs the targets to a website where the targets can access the selected content or can allow the target to browse the Internet as the case may be. If no content is selected by the targets then the method 300 takes no action at step 310. It should be noted that the plural tense is used here as the content transceiver unit 10 can be sending the same introductory content page and the same content to more than one target device.

At step 312, the content transceiver unit 10 determines whether there is a new introductory content page should be transmitted according to the content campaign schedule. If the decision result at step 312 is true, the method 300 then goes to step 306 where the content transceiver unit 10 accesses or generates the new introductory content page. If the decision result at step 306 is false, the method 300 then goes to step 314.

At step 314, the content transceiver unit 10 determines whether it is time to provide new content from a new content provider according to the content delivery schedule. If the decision result at step 314 is true, the method 300 then goes to step 302 where the content transceiver unit 10 determines who the new content provider is. If the decision result at step 314 is false, the method 300 then goes to step 316. In various embodiments, step 314 can also cover the case in which the content transceiver unit 10 checks with a central repository or server to determine whether there has been any updates to the content in a content campaign or whether there is new content for a new content campaign. This can be done periodically throughout the day, when the content transceiver unit 10 is first turned on during the day, when it is turned off at the end of the day or according to any other suitable time interval. In other embodiments, new content for an existing content campaign or new content for a new content campaign can be pushed to the content transceiver unit 10.

At step 316, the content transceiver unit 10 determines whether it is time to stop transmitting content. For example, it could be closing time at a shopping mall or event venue where the content transceiver unit 10 is installed. If the decision result at step 316 is true, the method 300 then goes to step 318 and ends all content transmission sessions. If the decision result at step 316 is false, the method 300 then goes to step 308 and continues to generate content introductory pages according to the content campaign schedule.

Figure 5:
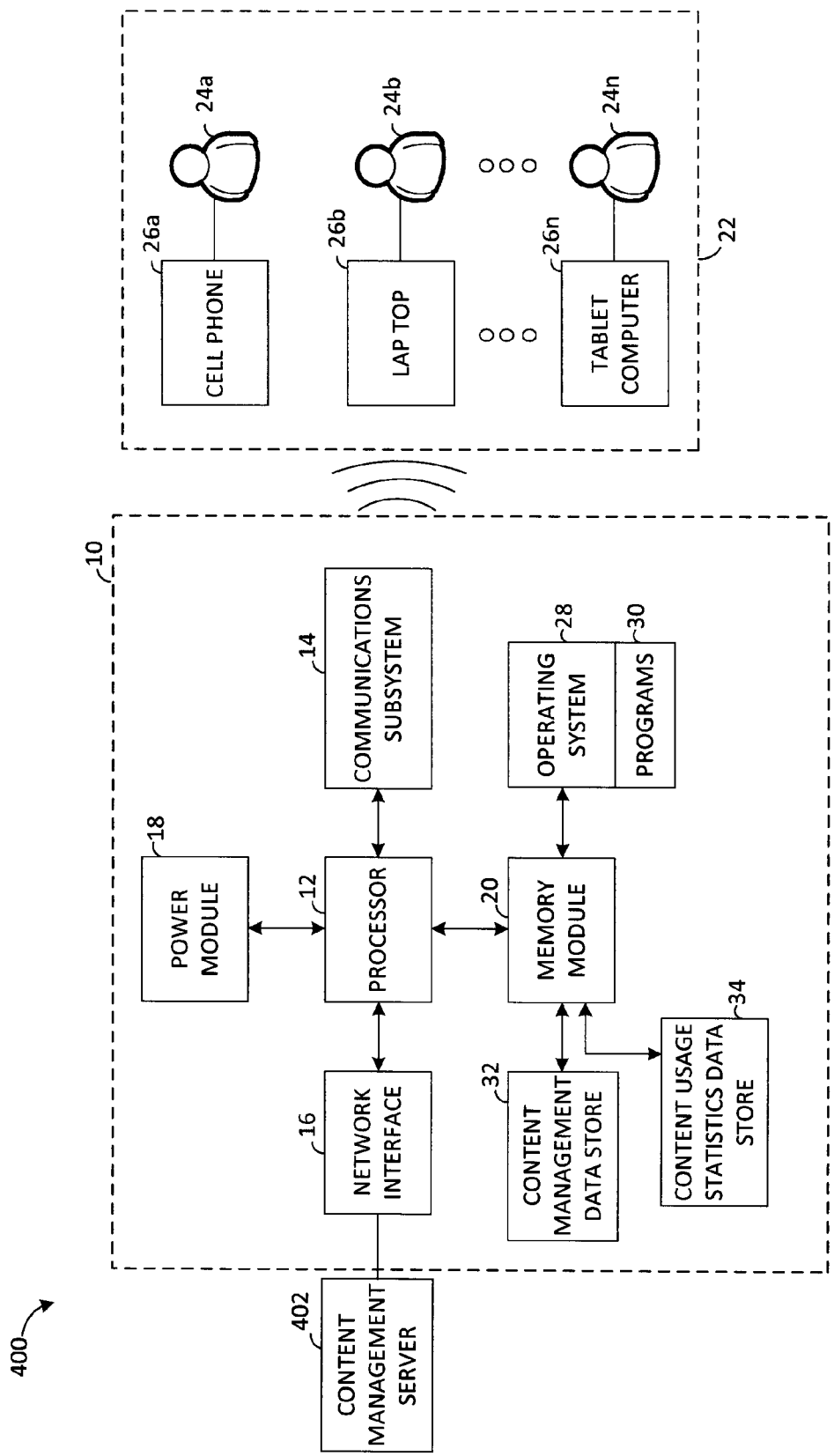
FIG. 5 is a block diagram of another example embodiment of a location-based content delivery system including a server and a content transceiver unit.

Referring now to FIG. 5, shown therein is a block diagram of another example embodiment of a location-based content delivery system 400 which includes a content transceiver unit 10 that interacts with a content management server 402. The structure of the content management server 402 is not shown but will be understood by those skilled in the art to comprise a similar internal structure as that shown for the content transceiver unit 10 with additional program instructions to provide some or all of the functions described with respect to FIGS. 5 to 8G. The content transceiver unit 10 operates as previously described with respect to FIGS. 1 to 4. The content management server 402 allows an administrator to configure the content transceiver unit 10 by updating its content, content campaign schedules, and content delivery schedules. The content management server 402 also allows an administrator to access and reset the content usage statistics that are stored on the content transceiver unit 10. The content management server 402 can be connected to the content transceiver unit 10 to the network interface 16 of the content transceiver unit 10 through a hard-wired connection or through a wireless modem. Alternatively, the content management server 402 can be connected to content transceiver unit 10 through the communications subsystem 14.

Figure 6:
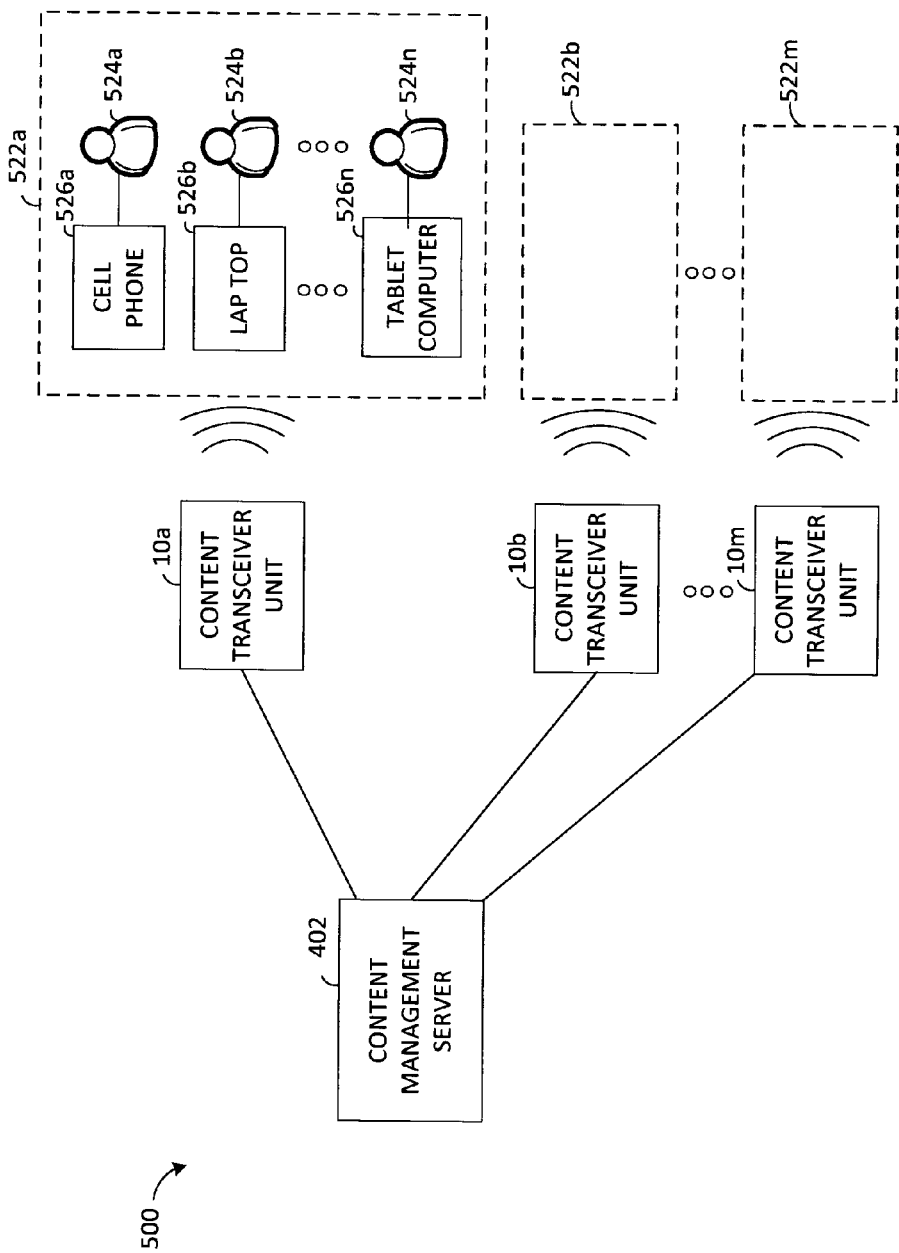
FIG. 6 is a block diagram of another example embodiment of a location-based content delivery system including a server and several content transceiver units transmitting content to several target zones.

Referring now to FIG. 6, shown therein is a block diagram of another example embodiment of a location-based content delivery system 500 which includes the content management server 402 to provide centralized control to a plurality of content transceiver units 10a to 10m. In this case, the content transceiver units 10a to 10n each communicate to different target zones 522a to 522m respectively. The content transceiver units 10a to 10m can be transmitting different content campaigns in the different target zones 522a to 522m. Alternatively, there can be some situations in which the content transceiver units 10a to 10n are transmitting the same content campaigns to the different target zones 522a to 522m. In either case, the content transceiver units 10a to 10m generally operate independently of one another. However, there may be instances in which the content transceiver units 10a to 10m operate in concert with one another such as when implementing a "treasure-hunt" marketing campaign in which a content provider can run a location-specific event where a prize is given at the end of a treasure hunt. Each content transceiver unit will have, as the content, a specific clue which will lead the target to the next content transceiver unit and so on. The final content transceiver unit will transmit the content which will provide a prize (coupon, song, etc.).

The content management server 402 can collect content usage statistics from each of the transceiver units 10a to 10m and amalgamate the results so that the content provider can determine the overall effectiveness of the content campaign. Alternatively, or in addition thereto, the content management server 402 can maintain the usage statistics separately for each target zone 522*a* to 522*m* to determine the effectiveness of the content campaigns in each of the target zones 522*a* to 522*m* separately.

In the location-based content delivery system 500, the content management server 402 allows an administrator to configure multiple content transceiver units 10*a* to 10*m* by updating the content that is provided by these units as well as revising the content campaign schedule that dictates which content is sent at which times of the day on each content transceiver unit. The content management server 102 may also allow an administrator to configure and access statistics from the content transceiver units 10*a* to 10*m* and combine the statistics in various ways.

Figure 7:
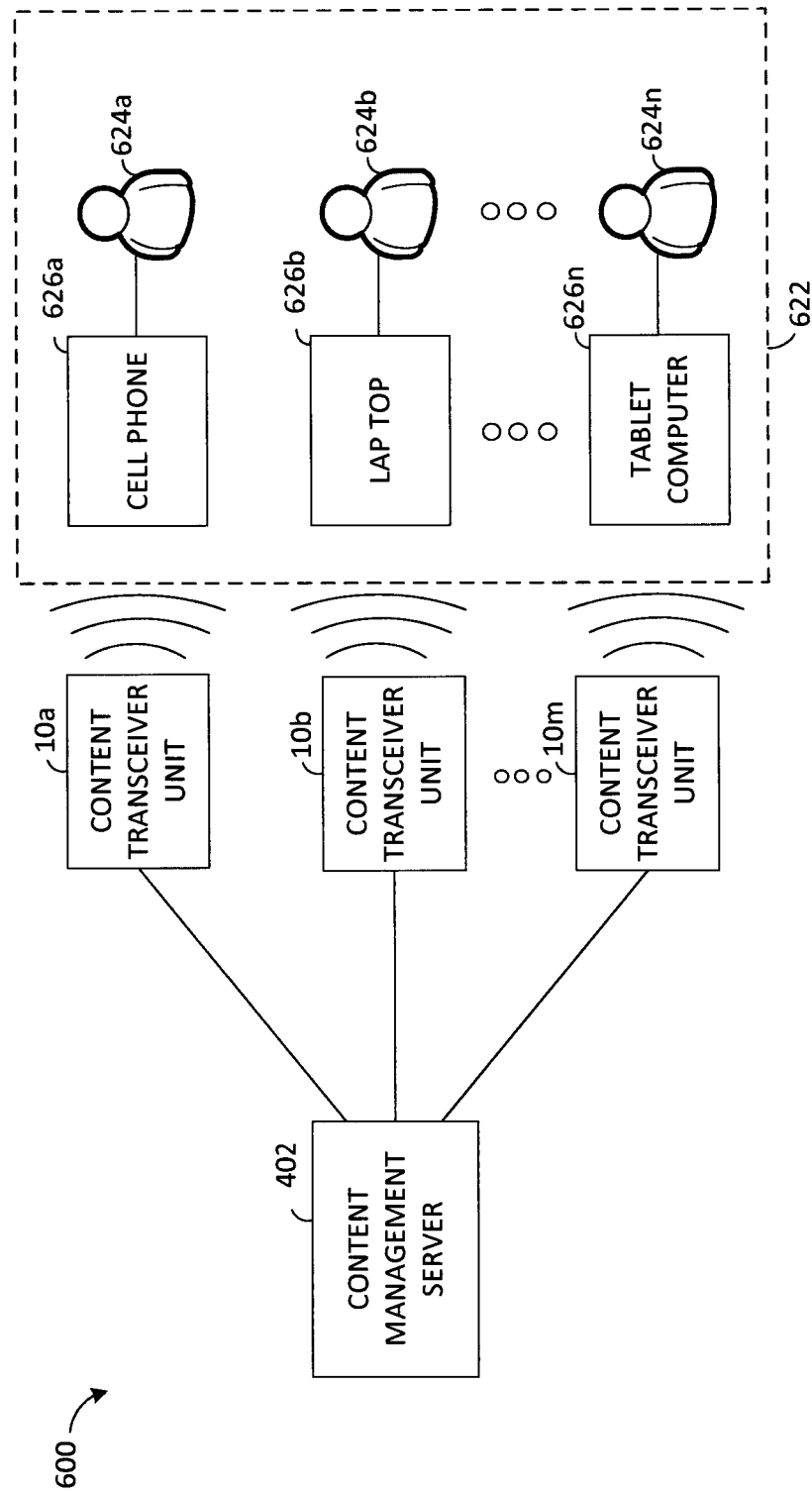
FIG. 7 is a block diagram of another example embodiment of a location-based content delivery system including a server and several content transceiver units transmitting content to the same target zone.

Referring now to FIG. 7, shown therein is a block diagram of another example embodiment of a location-based content delivery system 600 which includes the content management server 402 to provide centralized control for a plurality of content transceiver units 10*a* to 10*m*. In this case, the content transceiver units 10*a* to 10*m* each communicate to the same target zone 622. This configuration is useful when the number of expected targets in the target zone 622 is more than can be accommodated by a single content transceiver unit. Accordingly, the number of content transceiver units 10*a* to 10*m* is selected to provide enough channels to communicate content to the targets 624*a* to 624*m*. Alternatively, the target zone 622 can be too large for a single content transceiver unit to adequately transmit content to all areas of the target zone 622. In this case, the number of content transceiver units 10*a* to 10*m* is selected to provide enough coverage over a substantial portion of the target zone 622. There can also be situations which are a combination of these two cases in which case the number of content transceiver units 10*a* to 10*m* are selected to provide adequate coverage of the target zone 622 as well as provide a sufficient number of channels to communicate with the expected number of targets. The content transceiver units 10*a* to 10*m* can be transmitting the same or different content campaigns in the target zone 622. In the case where there are multiple content transceiver units 10 transmitting target zone presence signals, a given target mobile device will show its user the strongest received target zone presence signal. Once again, the content management server 402 can combine the usage statistics for each of the content transceiver units 10*a* to 10*m*.

It should also be noted that there can be other embodiments which are hybrids of the embodiments shown in FIGS. 6 and 7 since there can be location-based content delivery systems with multiple content transceiver units which provide content to multiple target zones. For example, there can be at least one target zone that receives content from more than one content transceiver unit in combination with at least one target zone that receives content from one content transceiver unit.

In alternative embodiments of the location-based content delivery systems 400, 500 and 600, the content management server 402 can also be used to maintain a content management website that can be accessed by a content provider who wishes to update the content or content campaigns on a content transceiver unit. The operation of the content management website is described in more detail with respect to FIGS. 9A-9B.

In any of the embodiments in which there are multiple content transceiver units, the operation of these units can be synchronized through the content management server and/or content management website, as the case may be, so that these units can be configured to transmit at the same time, and the same rate with the same content, for example. The content transceiver units can also be configured to operate in different ways in which the units may not be synchronized with one another.

Figure 8A:
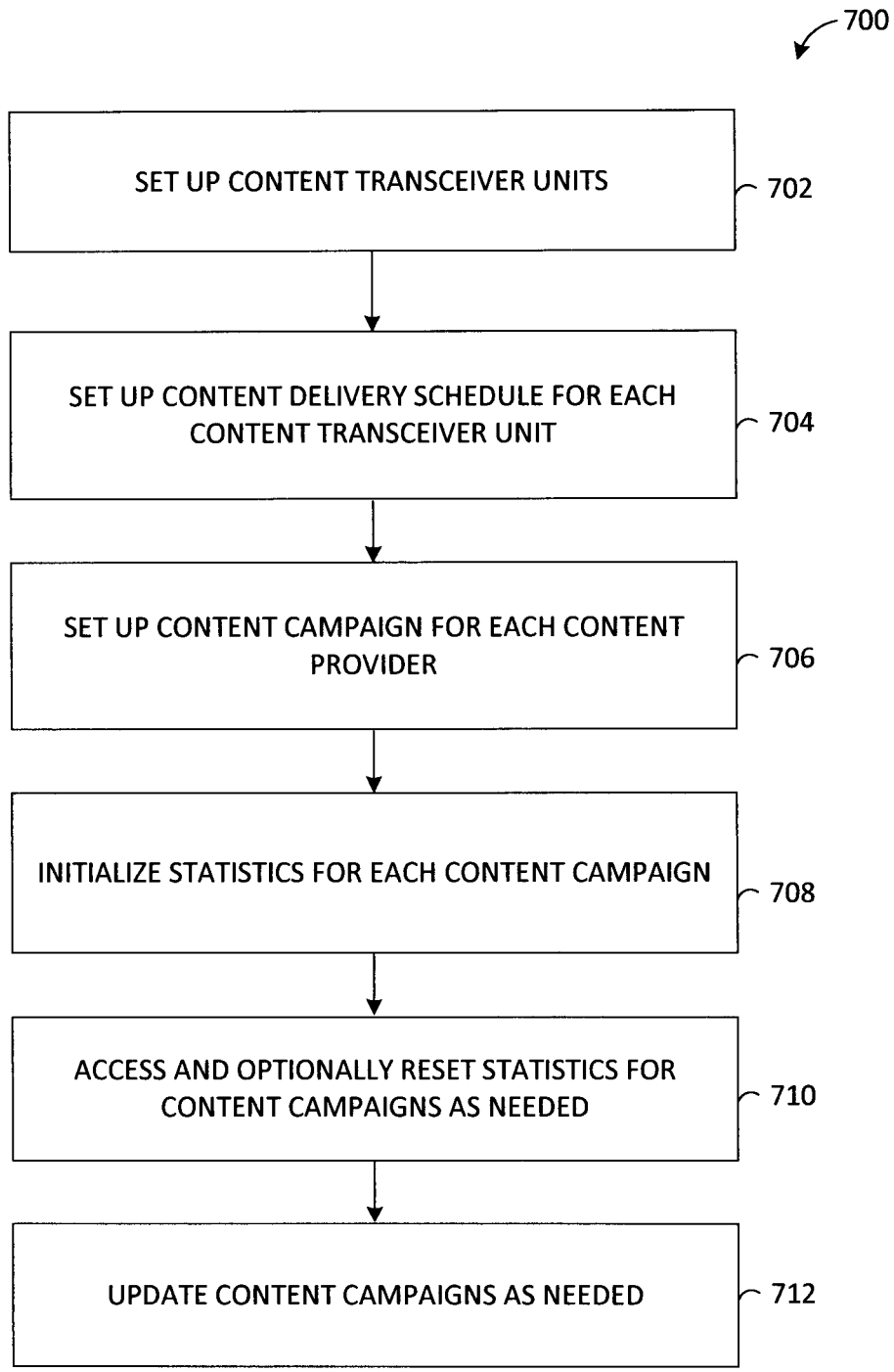
FIG. 8A is a flowchart of an example method for configuring the operation of the location-based content delivery system via a server.

Referring now to FIG. 8A, shown therein is a flowchart of an example method 700 for configuring the operation of a location-based content delivery system via a server. The method 700 can be used by a system administrator that centrally controls a network of content transceiver units. The method 700 can apply to any of the location-based content delivery systems described herein. The method 700 begins at step 702 which allows a system administrator to set up/configure the content transceiver units (which can also be referred to as nodes) of a location-based content delivery system. One example method for setting up the content transceiver units is described in more detail with respect to FIG. 8B. Step 704 allows the system administrator to set up the content delivery schedule for each of the content transceiver units. Content delivery schedules are described in more detail with respect to FIGS. 8C-8D.

Step 706 allows the system administrator to set up the content campaign for each content provider that is using the location-based content delivery system. This can involve setting up a new content repository for the content provider as well as setting up the billing information and subscription information for the content provider. The billing information is banking information and the like that is provided by the content provider so that they can pay for using the location-based content delivery system. The subscription information includes details on how long the content provider has signed up to transmit content on the location-based content delivery system. Further information on how the content campaign is created is described with respect to FIGS. 8E-8G.

Step 708 allows the system administrator to initialize the statistics for each content campaign. This can include configuring which statistics will be collected for each content campaign since different content providers may be interested in collecting different statistics to determine the effectiveness of the campaign. Once the campaign has been running for a while, the system administrator then accesses the statistics for various campaigns at step 710 in order to provide these statistics to the content provider so that they can determine the effectiveness of their content campaign. In some cases, these statistics can also provide the system administrator with information on how well the location-based delivery system is operating. For example, if there is a low percentage of content messages that are transmitted and properly received by target devices then this may indicate that the content transceiver units are not functioning properly or that the content transceiver units need to be adjusted so that they are better able to successfully transmit content messages to the target devices within the associated target zones.

Step 712 allows the system administrator to periodically update the content campaigns as required. For example, the content provider may decide to change a content campaign over time to make it more effective. There may be some embodiments in which the updating can also be done in real-time while the location based delivery system is operating. In other cases, the location-based content delivery system may change over time (e.g. more or less content transceiver units are used, changes in hours of operation, and the like) which can dictate a change in the settings of the content campaign.

Figure 8B:
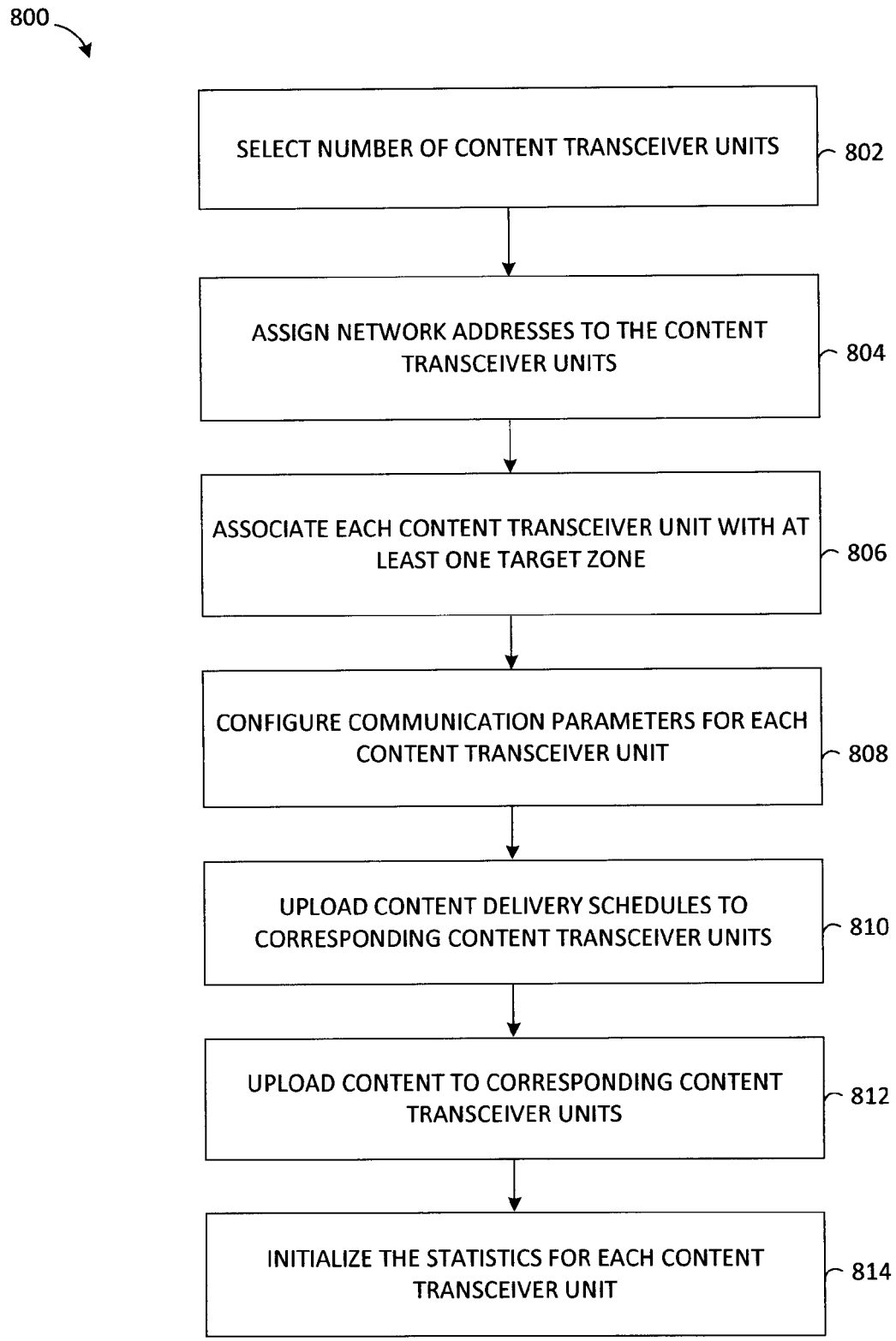
FIG. 8B is a flowchart of an example method for configuring a network of content transceiver units in a content delivery system.

Referring now to FIG. 8B, shown therein is a flowchart of an example method 800 for configuring a network of transceiver units in a content delivery system. With some minor modifications, the method 800 can also be applied to a location-based content delivery system in which there is only a single content transceiver unit. Step 802 allows the system administrator to select the number of content transceiver units that will be in the location-based content delivery system. Step 804 allows the system administrator to assign a network address, such as a MAC address, to each content transceiver unit. This will allow the system administrator to generate a record and a key for each content transceiver unit. Step 806 allows the system administrator to associate the content transceiver unit with at least one target zone. Step 808 allows the system administrator to configure various communication parameters for the content transceiver units such as the number of transmission channels, the strength of the transmission signals, the range of the signal, the starting and ending times at which transmissions generally occur (i.e. the daily operational time of the units) and the like. The system administrator can then turn on the content transceiver units using the generated keys and initiate a communication with the content transceiver units to ensure that they can communicate with the content management server. Step 810 allows the system administrator to upload the content delivery schedules to the corresponding content transceiver units. Step 812 allows the system administrator to upload the content campaigns to the corresponding content transceiver units. Step 814 allows the system administrator to initialize the statistics for each of the content transceiver units in terms of which statistics are to be collected for each content campaign that is transmitted on the content transceiver units. It should be noted that in the context of method 700, steps 810 and 812 of method 800 can be done after steps 704 and 706 of method 700 are completed.

Referring now to FIG. 8C, shown therein is an example of a content delivery schedule 850 that can be used for a network of content transceiver units in a content delivery system. There may be other alternative embodiments in which additional or fewer fields are used. The content delivery schedule 850 can be implemented in a database that includes a content transceiver unit field 852, a day field 854, a time slot field 856, a content provider field 858 and an introductory content page field 860. The content transceiver unit field 852 specifies which content transceiver unit is to transmit the content specified in the database record. The day field 854 and the time slot field 856 indicate the day and time period during the day, respectively, during which the content specified in the database record is to be transmitted. The content provider field 858 specifies which content provider is providing content to be transmitted during the time slot specified in the record. The introductory content page field 860 specifies which introductory content page is to be transmitted for the content provider.

Another database can be checked to retrieve the content associated with the introductory content page as is described with respect to FIGS. 8F-8G. As can be seen in the time slot field 856 for this example, the transmission times can be scheduled in various time interval blocks. While 10 minute and half-hour intervals are shown, other intervals can be used such as, but not limited to, 1 minute, 2 minutes, 5 minutes, 15 minutes, 1 hour, 2 hours and the like.

Referring now to FIG. 8D, shown therein is an example of a content delivery schedule 870 for a particular content provider. There may also be other alternative embodiments in which additional or fewer fields are used. The content delivery schedule 870 can be implemented in a database that includes a content campaign field 872, a content delivery location field 874, a content transceiver unit field 876, a day field 878, a time slot field 880, and an introductory content page field 882. The content campaign field 872 identifies that this content delivery schedule is for a certain campaign for the content provider. The content delivery location field 874 specifies which network of content transceiver units is being used for the campaign since there can be different networks of content transceiver units associated with (i.e. installed at) different locations. The content transceiver unit field 876 specifies which content transceiver unit is to transmit the content specified in the database record. The day field 878 and the time slot field 880 indicate the day and time period during the day, respectively, during which the content specified in the database record is to be transmitted. The introductory content page field 882 specifies which introductory content page is to be transmitted for the content provider during the time slot. As explained previously, another database can be checked to retrieve the content associated with the introductory content page as is described with respect to FIGS. 8F-8G.

It should be noted that formats other than the ones shown in FIGS. 8C-8D can be used to specify the content delivery schedule for a given content transceiver unit or for a given content campaign. Each of the content delivery schedules can also be specified for a certain period of time such as days or weeks or months and the like.

Figure 8E:
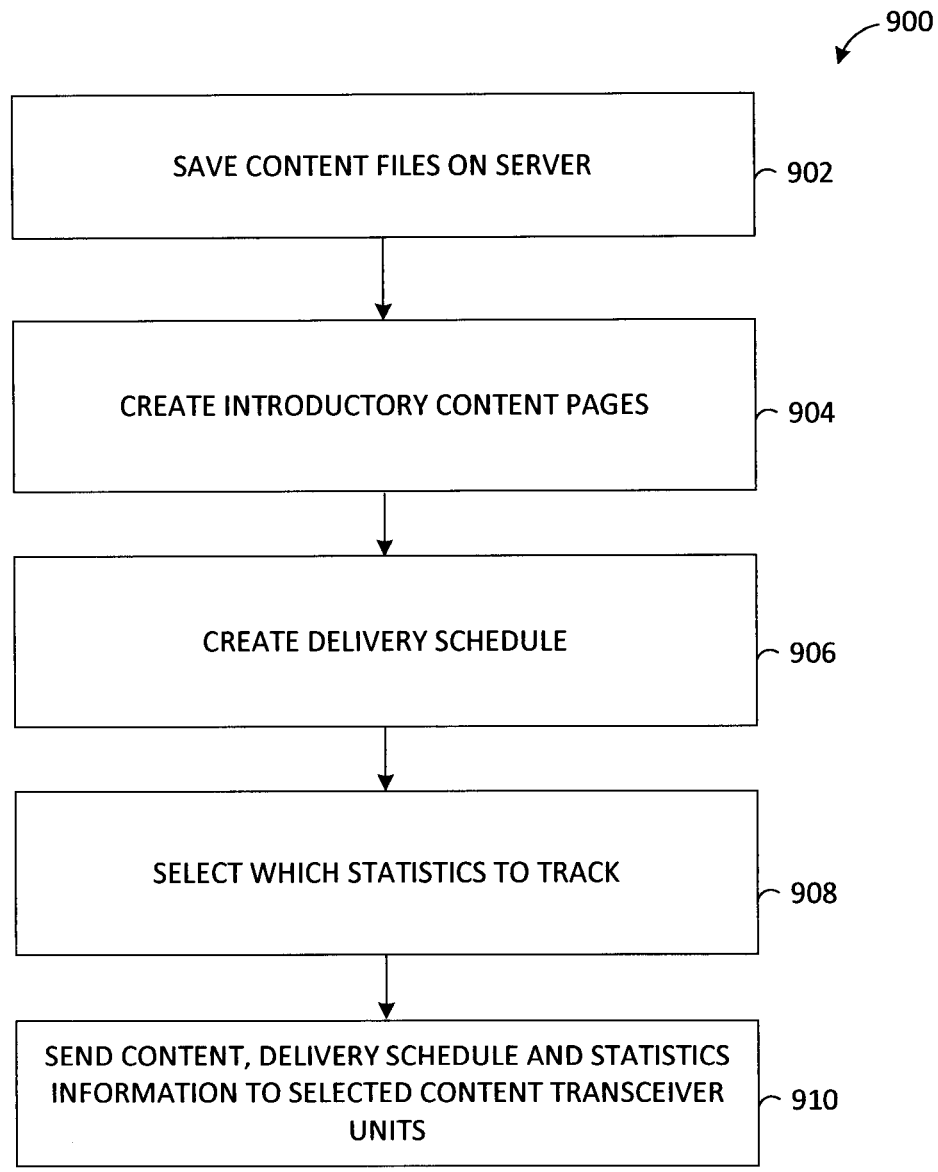
FIG. 8E is a flowchart of an example method for creating a content campaign.

Referring now to FIG. 8E, shown therein is a flowchart of an example method 900 for creating a content campaign for a given content provider. A system administrator of a location-based content delivery system can use the method 900 to configure new or existing content campaigns in a centralized fashion depending on which steps are followed. Step 902 allows the system administrator to store content files in a content repository on the server for the content campaign. An example of a database for a content repository is shown in FIG. 8F. The content files can include, but are not limited to, at least one of an image file, a video file, a sound file, a website address, or links to any of these files. Other content files, as described herein, can also be stored at this point. More than one file of the same file type can also be stored in the content repository.

Step 904 allows the system administrator to create one or more introductory content pages for the content campaign. The introductory content pages can use the example general format that was described with respect to FIG. 3 or a variation thereof. One or more of the content files from step 902 is associated with a given introductory content page. FIG. 8G provides an example embodiment of a database that can be used to create the introductory content pages.

Step 906 allows the system administrator to create a content delivery schedule for the content campaign. This involves first selecting a network of content transceiver units at the location at which the content campaign is to be transmitted to targets. The system administrator then specifies which content transceiver units in the selected network will transmit the content introductory pages and the days and time slots during which the content introductory pages are to be transmitted. An example content delivery schedule is shown in FIG. 8D.

Step 908 allows the system administrator to select which statistics are tracked to allow the content provider associated with the content campaign to determine the effectiveness of the content campaign. Input for this selection can be provided by the content provider. Various statistics have already been described herein with respect to the description of FIG. 1.

Step 910 allows the system administrator to send the content, content delivery schedule and statistics information to the selected content transceiver units. The selected content transceiver units are now configured to transmit the content and gather the required statistics according to the content campaign. This step also allows the system administrator to activate the content transceiver units so that they can operate according to one or more content campaigns that have been assigned to it.

Referring now to FIG. 8F, shown therein is an example database for a content repository 950 of a content provider. The content repository 950 comprises a content provider field 952, a content file number field 954, a content campaign number field 956, a file type field 958, a file size field 960 and a file link field 962. There may be other alternative embodiments of the content repository which can include more or less fields as required.

The content provider field 952 indicates which content provider the content repository is associated with. The content file number field 954 is a record number used to discriminate the various content files from one another. The content campaign number field 956 indicates which content campaign the content file is to be used with. This field can be optional as the same information can be provided in the repository used to create the content introductory pages as described in FIG. 8G. The file type field 958 indicates the file type for the content file, which includes, but is not limited to, image files, video files, application files and the like. For example, jpeg or gif images, mp3 audio, 3gp video and java files (e.g. .jar, .sisx and .jad) can be stored in the content repository 950 although it should be understood that other types of files can also be stored. The file size field 960 indicates the size of the content files. The file link field 962 can indicate a link to where the content file is stored. There can also be a date field that indicates the date that a content file was stored in the content repository 950.

Referring now to FIG. 8G, shown therein is an example introductory content page database 1000 for configuring introductory content pages for a content campaign. The database 1000 includes an introductory content page number field 1002, a content provider field 1004, a content campaign number field 1006, a banner field 1008, a description field 1010, a coupon field 1012, a sound file field 1014, a video file field 1016, a website field 1018, an application field 1020, a survey field 1022, and a sales field 1024. The fields in the database 1000 are generally in accordance with the generic introductory content page 200 described with respect to FIG. 3. However, there can be other embodiments of the introductory content page database in which there are other fields or the content data for an introductory content page is otherwise indicated.

The introductory content page number field 1002 identifies a particular introductory content page, while the content provider field 1004 and the content campaign number field 1006 indicate the content provider and content campaign to which the introductory content page belongs. Each of the fields 1008-1024 can include a link to a content file in the content repository 950 if the content provided by the content file is to be included in a given content introductory page. For instance, for the introductory content page ICP1, the banner field 1008, the video file field 1016 and the application field 1020 include links to content files CF1, CF2 and CF3 respectively. The description field 1010, the coupon field 1012, the sound file field 1014, the website field 1018, the survey field 1022 and the sales field 1024 do not include links to any content files. Accordingly, the introductory content page ICP1 will have banner content, video content and application file content but none of the other types of content. It should be understood that various combinations of content files can be used to build a variety of different introductory content pages.

Figure 9A:
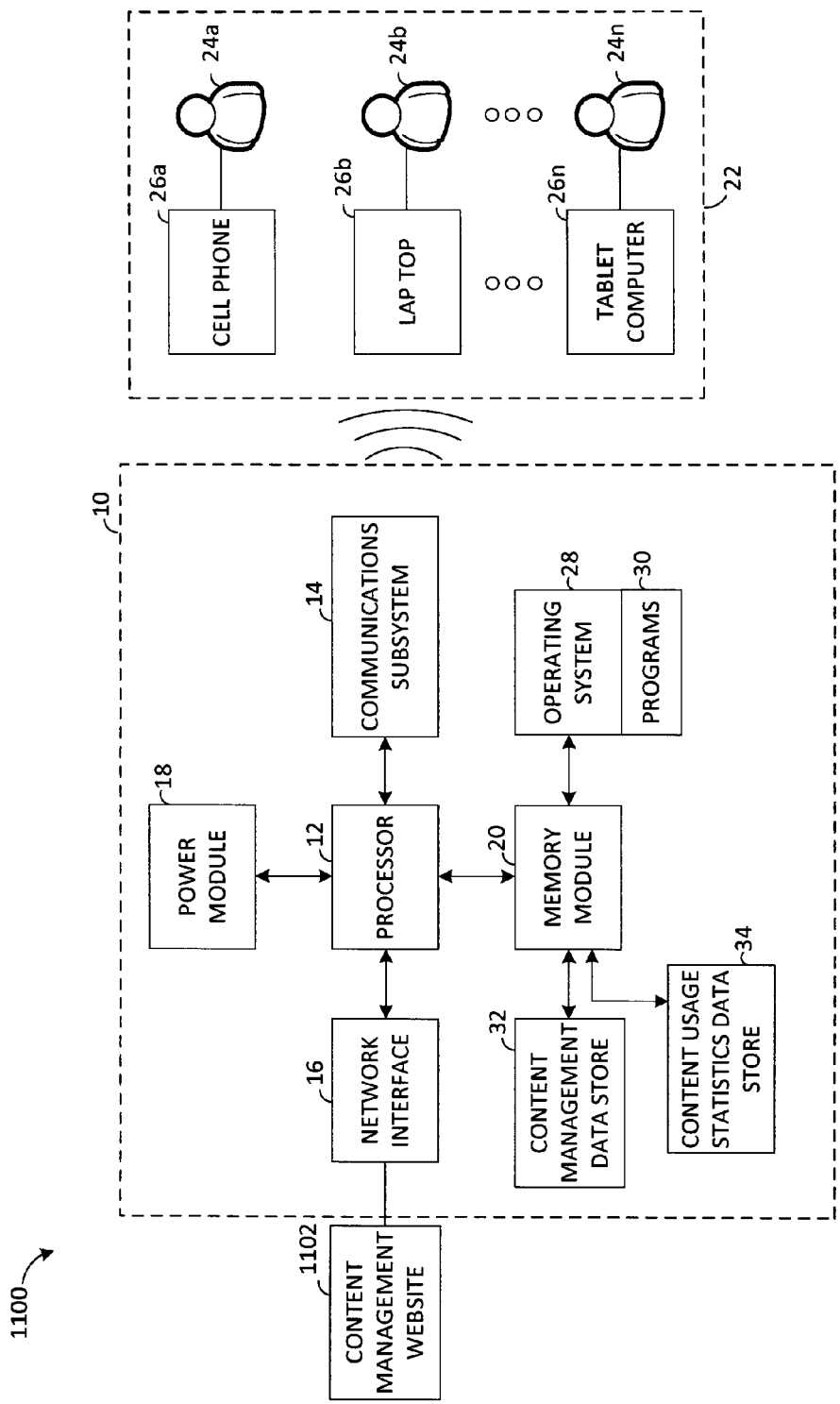
FIG. 9A is a block diagram of another example embodiment of a location-based content delivery system operating with a website allowing a content provider to directly manage their content campaign.

Referring now to FIG. 9A, shown therein is a block diagram of another example embodiment of a location-based content delivery system 1100 operating with a content management website 1102 that is provided by a server. The content management website 1102 allows a content provider to directly manage their content campaign so that the content provider can create a new content campaign, revise an existing content campaign, or terminate a content campaign. The content provider can also use the website 1102 in order to access the statistics for a content campaign. The operation of the website 1102 is described in more detail with regards to FIG. 9B.

Figure 9B:
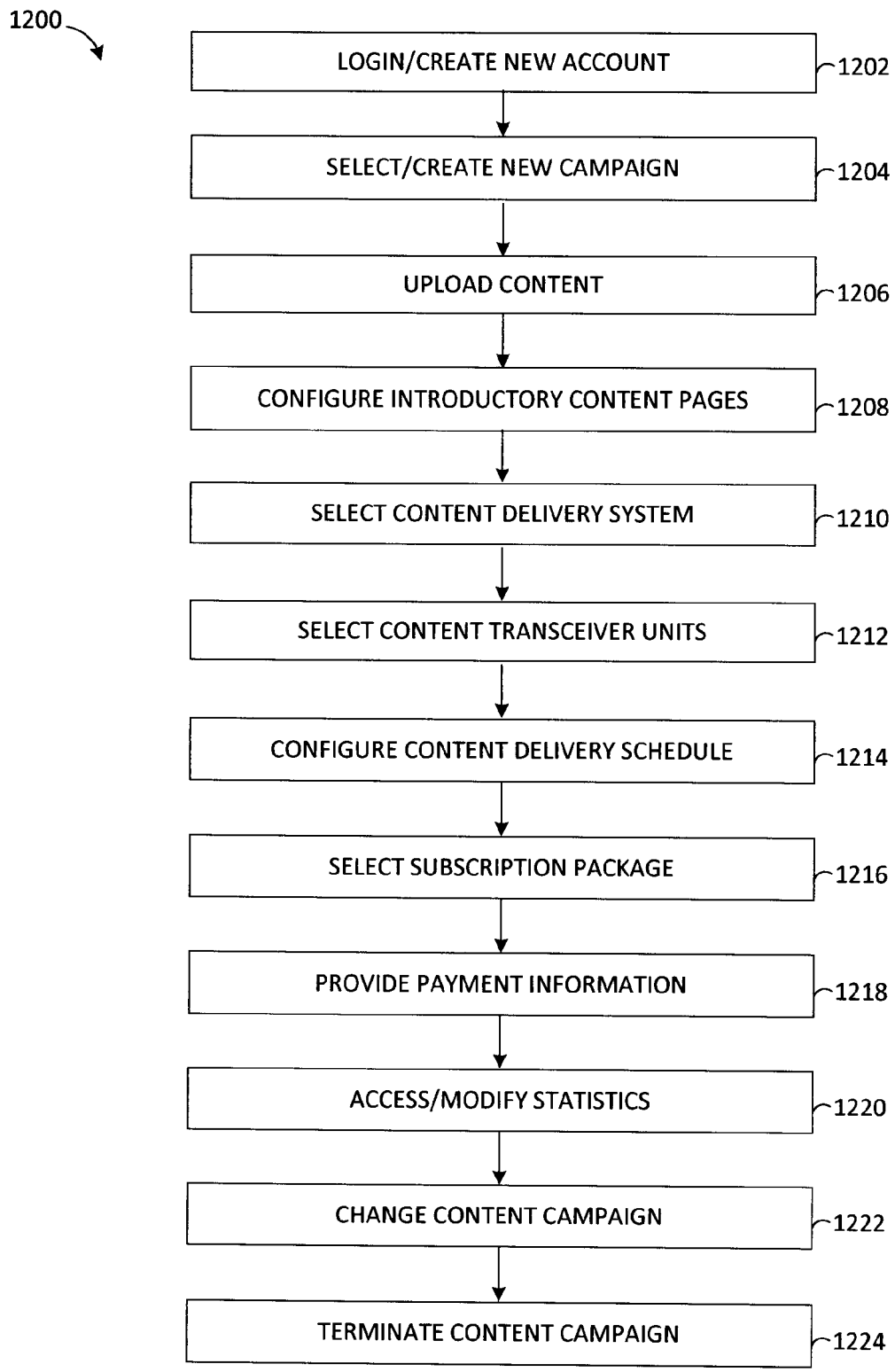
FIG. 9B is a flowchart of an example method for allowing a content provider to manage their content campaign through a website.

Referring now to FIG. 9B, shown therein is a flowchart of an example method 1200 for allowing a content provider to manage their content campaign through the website 1102. At step 1202, the method 1200 allows the content provider to login into an existing account. If the content provider is a new user of the location-based content delivery system, step 1202 allows the content provider to create a new user account by specifying a login ID and a password as is commonly known to those skilled in the art. The content provider can provide other information such as their name, location, contact information and the like.

Step 1204 allows the content provider to select an existing content campaign or create a new content campaign. At this point the content provider has an identifier (e.g. CP1) and the content campaign also has an identifier (e.g. CC1).

Step 1206 allows the content provider to upload content files for a selected existing content campaign or a newly created content campaign. This step can include specifying the file type for the uploaded content files although this may also be determined automatically by looking at the file extension (e.g. ".doc", ".txt", ".jpg", etc.). The content files along with the content provider identifier and the content campaign identifier are used in storing the content files in a content repository for the content provider. Data for other fields of the content repository such as file size and file link can be generated by the website as it stores the content files.

Step 1208 allows the content provider to configure the introductory content pages for the selected content campaign. This involves specifying how many introductory content pages to use with the content campaign and the content files that are to be used for each of the introductory content pages. Based on the provided information, the content provider identification (i.e. ID) and the content campaign ID, the content management website 1102 generates a record in an introductory content page repository and stores the required information (an example of this is shown in FIG. 8G).

Step 1210 allows the content provider to specify a network of content transceiver units at a desired location where the content provider would like to transmit the content campaign to targets if the content provider is creating a new content campaign. During this step, for an existing campaign, the content provider can specify a new network of content transceiver units to transmit the content campaign.

Step 1212 allows the content provider to select or modify particular content transceiver units within the selected network of content transceiver units that will transmit the content campaign. Recall that a network of content transceiver units can transmit content to more than one target zone at a particular location (e.g. one area of a shopping mall). Accordingly, this step effectively allows the content provider to select which content transceiver units will transmit the content campaign (and therefore which target zones will receive the transmitted content).

Step 1214 allows the content provider to configure the content delivery schedule for the content campaign based on the selected content transceiver units. This includes specifying the content that is transmitted by each of the selected content transceiver units during certain time periods of certain days. In one example embodiment, this information is specified by the content provider so that a content delivery schedule can be created according to the content delivery schedule shown in FIG. 8D. It should be understood that alternative formats can be used in other embodiments. Configuring the content delivery schedule also depends on the availability of the selected content transceiver units to transmit content since the content transceiver units may already be scheduled to transmit content for other content providers during certain time slots on certain days. Accordingly, this information can be provided to the content provider in this step (of course keeping the identity of the other content providers anonymous) so that the content provider can see the time slots that are available on certain days for the selected content transceiver units.

Step 1216 allows the content provider to select a subscription package (if they have not already done so) in which the content provider specifies how they will pay for the transmission of their content campaign(s). For example, the content provider can sign up for a periodic subscription in which they pay a fee periodically such as, but not limited to, daily, weekly, monthly or annually to broadcast content for a certain number of hours during a selected time period. The content provider can also subscribe for "temporary operation" in which one or more content transceiver units can be "rented" by the content provider at a certain rate such as an hourly rate, a daily rate, a weekly rate and the like based on how long they would like to use the content transceiver unit(s).

Step 1218 allows the content provider to provide payment information (if they have not already done so) for the subscription package that they have selected. The payment information can include credit card information, banking information or other payment information. The content provider may also specify another entity through which it will make payments (i.e. a PayPal account). The content provider may also select automatic renewals and automatic payments for example.

At step 1220, for a new content campaign, the method 1200 allows the content provider to select the statistics that are to be tracked for the content campaign. Various statistics can be selected as described herein, for example with respect to FIG. 1. For content campaigns that have been operating for a certain period of time, the method 1200 allows the content provider to access statistics for the content campaign so that the content provider can determine the effectiveness of the content campaign. The statistics can be provided to the content provider as a report in a document or in a spreadsheet. At this step, the content provider can also be able to revise which statistics are collected for a given content campaign in order to better assess the effectiveness of the campaign.

At step 1222, the method 1200 allows the content provider to change various parameters of a content campaign. For instance, the content provider can perform at least one of uploading new content files, deleting existing content files, selecting new locations to transmit content and modifying content delivery schedules. It should be noted that if content is uploaded through the website, the content can be stored in a central repository and in some embodiments the content can be screened and edited before it is ready to be sent as content to targets.

At step 1224, the method 1200 allows the content provider to terminate a content campaign that is no longer needed or that is not effective. The content provider may be given the option to save certain content files associated with the terminated content campaign in case the content provider wishes to use the content files for another content campaign.

It should be noted that at least one of the steps of the methods 700, 800, 900 and 1200 can be associated with a Graphical User Interface (GUI) such as a windows-based application or other user input-based program that provides various input means, such as text boxes, drop-down menus, radio buttons, and the like, to allow a system administrator or content provider, as the case may be, to provide various input information and/or make selections as needed in order to execute the steps of these methods. Accordingly, the steps of the methods 700, 800, 900 and 1200 have been described as allowing an entity to make a selection or configure an item which occurs in practice when servers or processors receive input information from a system administrator or content provider via one or more programs.

The various embodiments described herein can be used to provide content to a variety of different individuals under a variety of different situations and locations. As mentioned, for marketing applications, the various location-based content delivery systems described herein can be used for various purposes such as, but not limited to, promoting a new product, promoting a service, implementing a geographically targeted marketing campaign, promoting a mobile application, selling various items and the like. Content campaigns can also be generated for political campaigns. The various location-based content delivery systems described herein can also be deployed in certain areas to segment a market geographically and/or demographically (e.g. based on the type of potential individuals who will be in the target zone). The various location-based content delivery systems described herein can also help to increase a target's level of enjoyment in a target zone by providing them with relevant content as well as enhancing a target's shopping experience when marketing content is delivered in a retail environment (e.g. a shopping center) by providing the target with end-to-end service in which products or services are advertised and then links are provided to allow the target to purchase a product or service and specify shipping information if needed. The shopping experience can also be made more enjoyable by providing free coupons and special offers. In the latter case, brands and advertisers may benefit from this enhanced shopping experience if they are able to drive business to retailers that are located close by a location-based content delivery system that is delivering related content. Accordingly, the location-based content delivery systems described herein can help raise brand awareness, build relationships with potential consumers, and penetrate new markets. Further benefits of the location-based content delivery systems described herein include the ability to transmit rich multimedia content to mobile and Internet-based devices, the ability to provide brandable Wi-Fi and Bluetooth signal names, and the ability to tailor content schedule delivery based on location and time of day.

At least some of the elements of the location-based content delivery systems that are implemented via software may be written in a high-level procedural language such as object oriented programming or a scripting language. Accordingly, the program code may be written in C, $C^{++}$, SQL or any other suitable programming language and may comprise modules or classes, as is known to those skilled in object oriented programming. At least some of the elements of the location-based content delivery systems that are implemented via software may be written in assembly language, machine language or firmware as needed. In either case, the program code can be stored on a storage media or on a computer readable medium that is readable by a general or special purpose programmable computing device having a processor, an operating system and the associated hardware and software that is necessary to implement the functionality of at least one of the embodiments described herein. The program code, when read by the computing device, configures the computing device to operate in a new, specific and predefined manner in order to perform at least one of the methods described herein.

Furthermore, at least some of the methods described herein are capable of being distributed in a computer program product comprising a computer readable medium that bears computer usable instructions for one or more processors. The medium may be provided in various forms such as, but not limited to, one or more diskettes, compact disks, tapes, chips, USB keys, external hard drives, wire-line transmissions, satellite transmissions, internet transmissions or downloads, magnetic and electronic storage media, digital and analog signals, and the like. The computer useable instructions may also be in various forms, including compiled and non-compiled code.

While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without departing from the embodiments, the general scope of which is defined in the appended claims.

For example, there can be alternative embodiments in which a content transceiver unit does not have a content management data store or a content usage statistics data store and therefore does not store any of this information but rather receives all content information (i.e. introductory content pages, etc.) from a content management server just before sending the content to targets and sends any information that can be used to generate statistics to the content management server which then calculates and updates the statistics. In this case, the content management server can receive an indication from the content transceiver unit that a target has initiated a content transmission session and that the content transceiver unit requires the current introductory content page that is to be transmitted via the content delivery schedule. The content management server then provides the content transceiver unit with the correct introductory content page. Further content can be provided as needed based on the selections by the targets.

In a further alternative embodiment, the location-based content delivery system may be mobile and communicate with targets that are using mobile computing devices or stationary computing devices (e.g. a desktop computer) that can receive and transmit wireless signals. In this case, the location-based content delivery system may be implemented in a moving object, such as a truck, that travels to different locations, stays in the location for a given period of time to transmit campaign content and then travels to a different location to transmit the campaign content. This may have usage in political campaigns and the like.

In a further alternative embodiment, the stored content for a content campaign can be fully self-contained in the sense that no links are used to an external website. This then allows the content transceiver unit to distribute the content and interact with the targets such that connection to the Internet is not required. In this case, when sales of items are made, the content transceiver unit can be configured to receive the payment information and shipping information (if needed) from the target and process this information in order to complete the sale. In this case, the content transceiver unit can act as a point of sales device and includes the required software and hardware as is known by those skilled in the art.

The invention claimed is:

1. A system for providing location-based content delivery to at least one target device in at least one target zone defined by a target zone presence signal, the system comprising:
   at least one content transceiver unit generating the target zone presence signal, comprising:
      a processor configured to control the operation of the content transceiver unit; and
      a communications subsystem coupled with the processor;
      the communications subsystem being configured to communicate with any target device in the at least one target zone upon initiation of any content transmission session with the target zone presence signal by the target device; and
      the at least one content transceiver transmitting a plurality of introductory content pages and associated content selected by the at least one target according to a content delivery schedule that specifies a day and a time slot for a given introductory content page to be transmitted by the at least one content transceiver unit;
   whereby the processor is configured to send an introductory content page based on a content campaign to the at least one target device within the target zone when the at least one target device initiates a the content transmission session with the at least one content transceiver unit, and the processor is configured to send selected content to the at least one target device when the at least one target device selects a content option in the introductory content page.

2. The system of claim 1, wherein if the at least one target does not select a content option, the processor is configured to automatically send default content to the at least one target and provide the at least one target with a page that provides an opportunity to purchase items related to the default content.

3. The system of claim 1, wherein the at least one content transceiver unit further comprises a network interface for connection to the Internet and the processor is further configured to allow the at least one target to browse the Internet and track whether the at least one target visits websites associated with the content campaign.

4. The system of claim 1, wherein the processor is further configured to direct the at least one target to one or more content pages based on tastes or preferences of the at least one target.

5. The system of claim 1, wherein the system further comprises a content management server coupled to the at least one content transceiver unit, the content management server being configured to control the at least one content transceiver unit to wirelessly transmit content for at least one content campaign according to a the content delivery schedule.

6. The system of claim 1, wherein the processor is further configured to collect content usage statistics for a given content campaign to assess the effectiveness of the given content campaign.

7. The system of claim 1, wherein the processor is further configured to identify a mobile device used by the at least one target and track interactions with the mobile device over different sessions to configure content to send to the at least one target in future sessions.

8. The system of claim 1, wherein the system further comprises a plurality of content transceiver units with at least two of the plurality of content transceiver units being configured to transmit similar or different content campaigns to different target zones or to a common target zone.

9. The system of claim 1, wherein the communications subsystem communicates with a computing device used by the least one target, the computing device being one of a cell phone, a smart phone, a portable computer, a tablet computer and a desktop computer that can transmit and receive wireless signals.

10. The system of claim 1, wherein the communications subsystem comprises at least one of a Wi-Fi radio and a Bluetooth radio to communicate with the at least one target using at least one of a Wi-Fi signal and a Bluetooth signal respectively.

11. The system of claim 1, wherein the introductory content page comprises at least one content option to allow the at least one target to select content associated with the content campaign.

12. The system of claim 11, wherein the at least one content option comprises at least one of a coupon object, a sound file object, a video file object, a website object, an application object, a survey object and a sales object.

13. The system of claim 11, wherein the introductory content page further comprises at least one of a banner area and a description area that provides a description of at least one of the content campaign and a content provider.

14. The system of claim 1, wherein the system further comprises a server configured to provide a content management website that is coupled to the at least one content transceiver unit, the content management website being configured to allow a content provider to create the content campaign, transmit the content campaign using one or more content transceiver units at a given location according to a content delivery schedule and collect statistics related to the content campaign.

15. The system of claim 1, wherein the content campaign comprises content related to at least one of a product launch, a product sale, a service sale, a ticket sale, a brand awareness campaign, a cultural event, a sporting event, a historical event, a historical location, a park location, a convention, an entertainment event and a political campaign.

16. The system of claim 1, wherein the at least one content transceiver unit can be installed at one of a store, a fashion show, a sporting event, an exhibition, a concert, a trade show, a convention, a festival, a shopping mall, a theatre, a restaurant, a transportation station, a transportation vehicle, an arena, a hotel, a museum, an art gallery, a park, a beach, an office building, a monument, a street corner, and a park.

17. The system of claim 1, wherein statistics can be recorded for the content campaign, the statistics comprising at least one of total content transmissions during certain time periods in a given content campaign, total content transmissions for each type of content in the given content campaign, total content transmission for each type of content in the given content campaign during certain time periods, and Internet browsing habits of the at least one target when provided with content from the given content campaign.

18. A method for providing location-based content delivery to at least one target zone, wherein the method comprises: transmitting a target zone presence signal to the at least one target zone using a communications subsystem of a content transceiver unit; detecting if at least one target in the at least one target zone wishes to engage in a content transmission session with the content transceiver unit; sending an introductory content page based on a content campaign to the at least one target using the communications subsystem if the at least one target wishes to engage in the content transmission session according to a content delivery schedule that specifies a day and a time slot for a given introductory content page to be transmitted by the at least one content transceiver unit; and sending selected content to the at least one target using the communication subsystem if the at least one target selects a content option in the introductory content page.

19. The method of claim 18, wherein if the at least one target does not select a content option, the method further comprises automatically sending default content to the at least one target and providing the at least one target with a page that provides an opportunity to purchase items related to the default content.

20. The method of claim 18, wherein the method further comprises allowing the at least one target to browse the Internet and track whether the at least one target visits websites associated with the content campaign.

21. The method of claim 18, wherein the method further comprises directing the at least one target to one or more content pages based on tastes or preferences of the at least one target.

22. The method of claim 18, wherein the method further comprises controlling the at least one content transceiver unit to wirelessly transmit content for at least one content campaign according to the content delivery schedule.

23. The method of claim 18, wherein the method further comprises identifying a mobile device used by the at least one target and tracking interactions with the mobile device over different sessions to configure content to send to the at least one target in future sessions.

24. The method of claim 18, wherein the method comprises providing the introductory content page with at least one content option that allows the at least one target to select content associated with the content campaign.

25. The method of claim 24, wherein the at least one content option comprises at least one of a coupon object, a sound file object, a video file object, a website object, an application object, a survey object and a sales object.

26. The method of claim 24, wherein the method further comprises providing the introductory content page with at least one of a banner area and a description area that provides a description of at least one of the content campaign and a content provider.

27. The method of claim 18, wherein the method further comprises transmitting a plurality of introductory content pages and associated content selected by the at least one target according to a content delivery schedule that specifies a day and a time slot for a given introductory content page to be transmitted by the at least one content transceiver unit.

28. The method of claim 18, wherein the method further comprises providing a content management website to allow a content provider to create the content campaign, transmit the content campaign using one or more content transceiver units at a given location according to a content delivery schedule and collect statistics related to the content campaign.

29. The method of claim 18, wherein the content campaign comprises content related to at least one of a product launch, a product sale, a service sale, a ticket sale, a brand awareness campaign, a cultural event, a sporting event, a historical event, a historical location, a park location, a convention, an entertainment event and a political campaign.

30. The method of claim 18, wherein the method comprises installing the at least one content transceiver unit at one of a store, a fashion show, a sporting event, an exhibition, a concert, a trade show, a convention, a festival, a shopping mall, a theatre, a restaurant, a transportation station, a transportation vehicle, an arena, a hotel, a museum, an art gallery, a park, a beach, an office building, a monument, a street corner, and a park.

31. The method of claim 18, wherein the method further comprises recording statistics for the content campaign, the statistics comprising at least one of total content transmissions during certain time periods in a given content campaign, total content transmissions for each type of content in the given content campaign, total content transmission for each type of content in the given content campaign during certain time periods, and Internet browsing habits of the at least one target when provided with content from the given content campaign.

32. A non-transitory computer readable medium comprising a plurality of instructions executable on a microprocessor of an electronic device for adapting the electronic device to implement a method of providing location-based content delivery to at least one target zone, wherein the method comprises: transmitting a target zone presence signal to the at least one target zone using a communications subsystem of a content transceiver unit; detecting if at least one target in the at least one target zone wishes to engage in a content transmission session with the content transceiver unit; sending an introductory content page based on a content campaign to the at least one target using the communications subsystem if the at least one target wishes to engage in the content transmission session according to a content delivery schedule that specifies a day and a time slot for a given introductory content page to be transmitted by the at least one content transceiver unit; and sending selected content to the at least one target using the communication subsystem if the at least one target selects a content option in the introductory content page.

* * * * *